Sept. 28, 1943.   J. D. PEDERSEN   2,330,737
RIFLE MECHANISM
Filed July 29, 1939   14 Sheets-Sheet 1
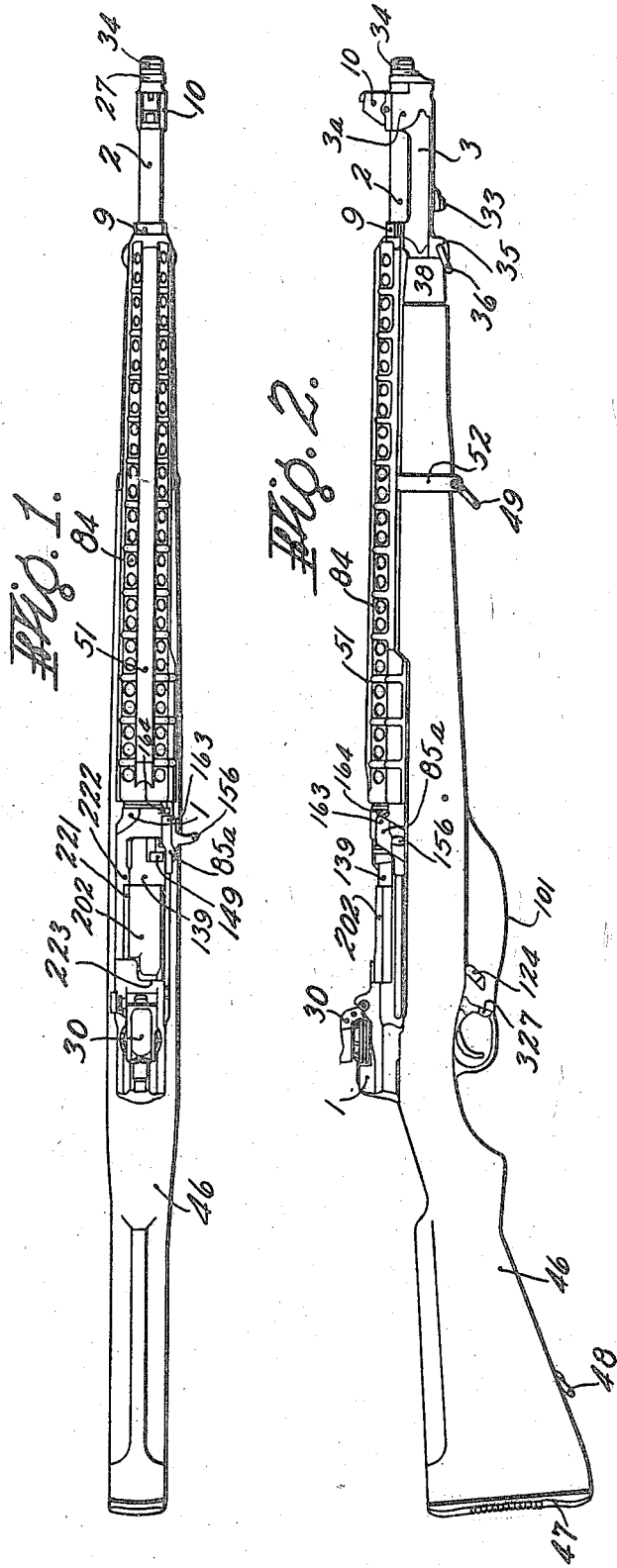
INVENTOR
John D. Pedersen
BY Chapin & Neal
ATTORNEYS

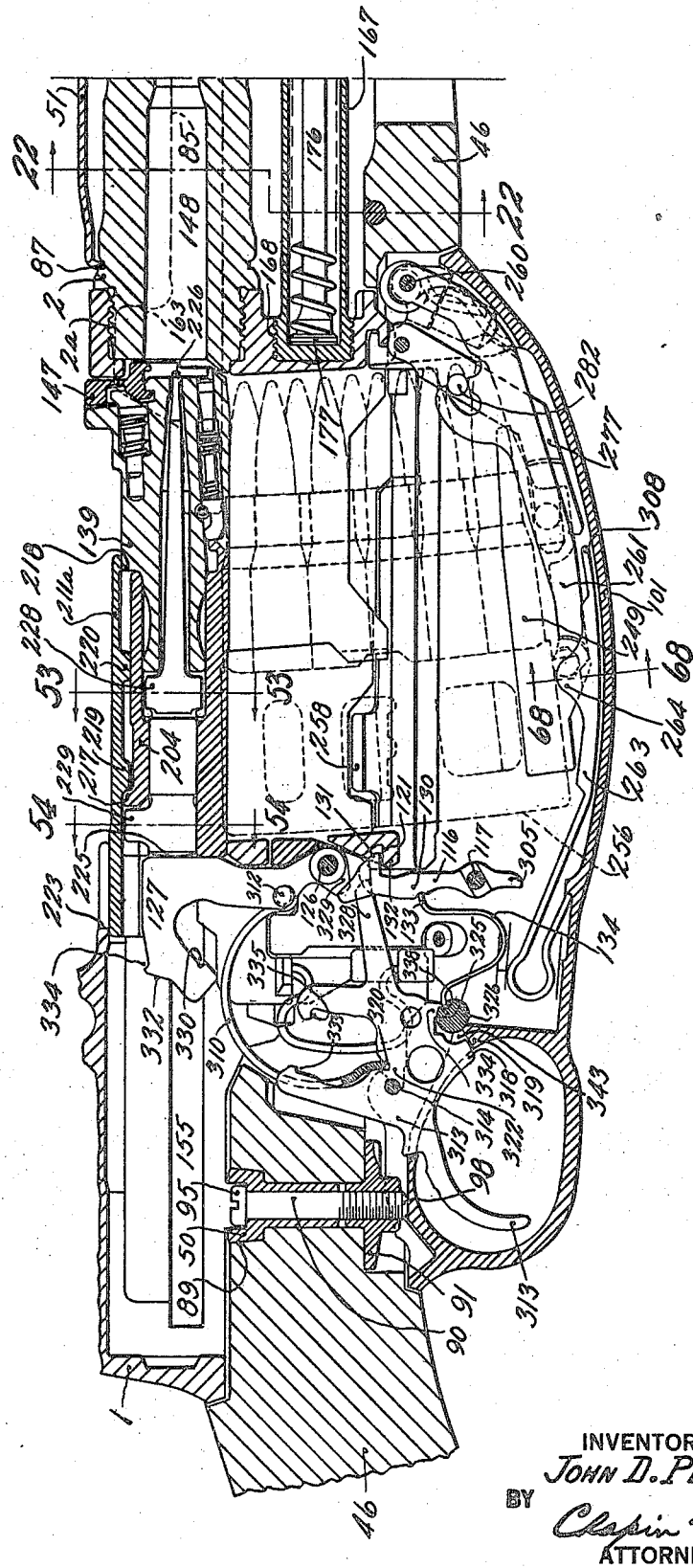

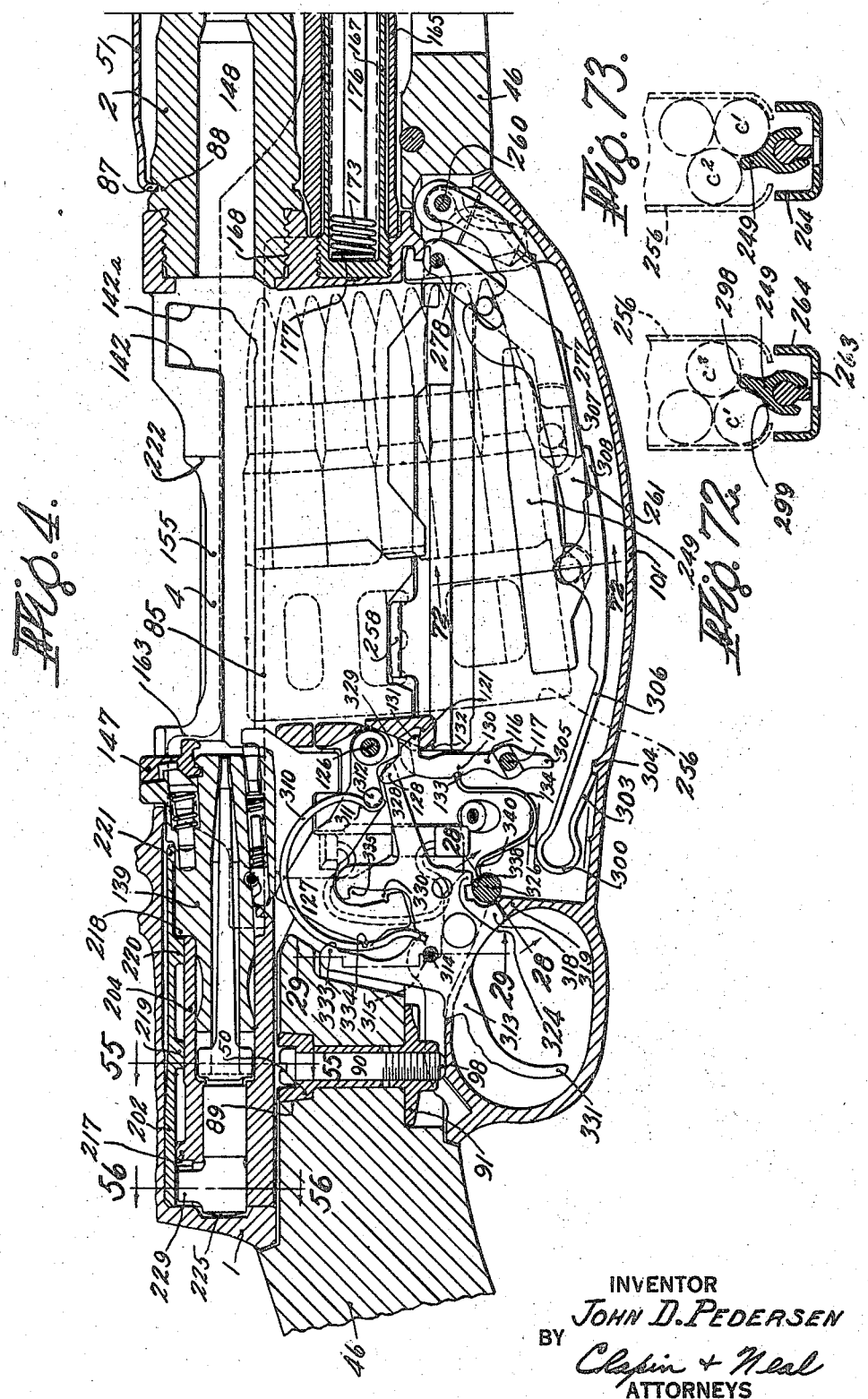

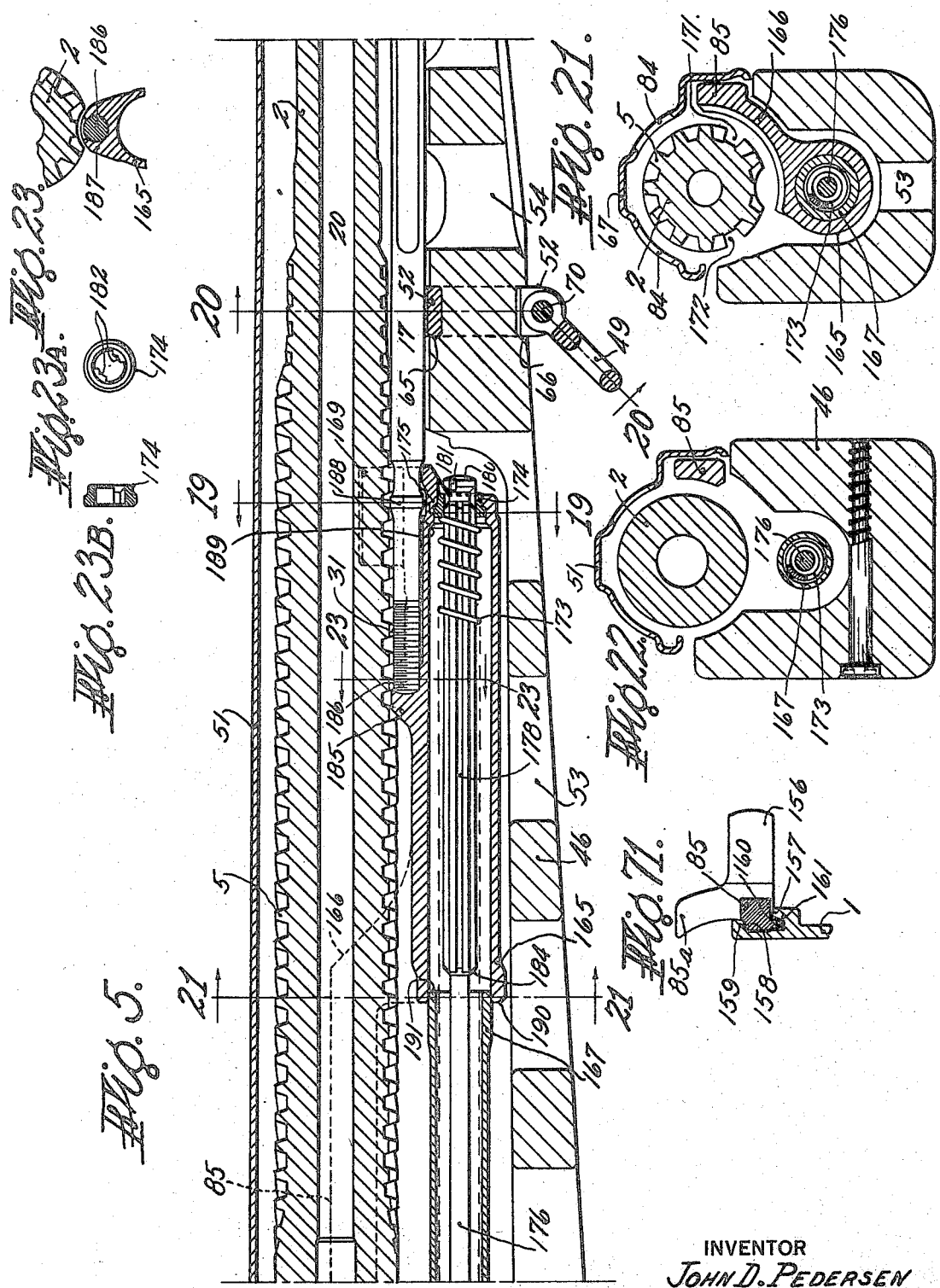

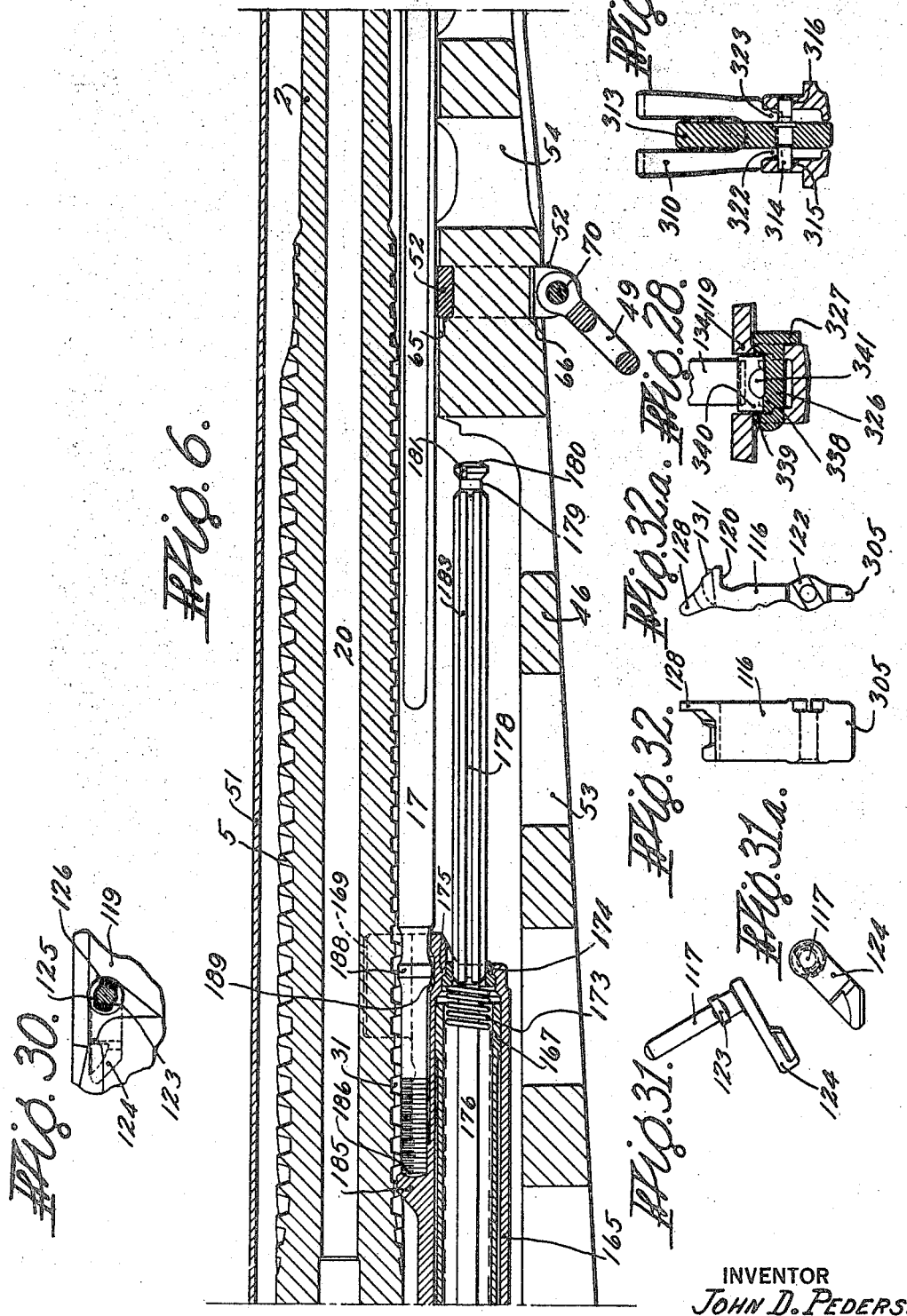

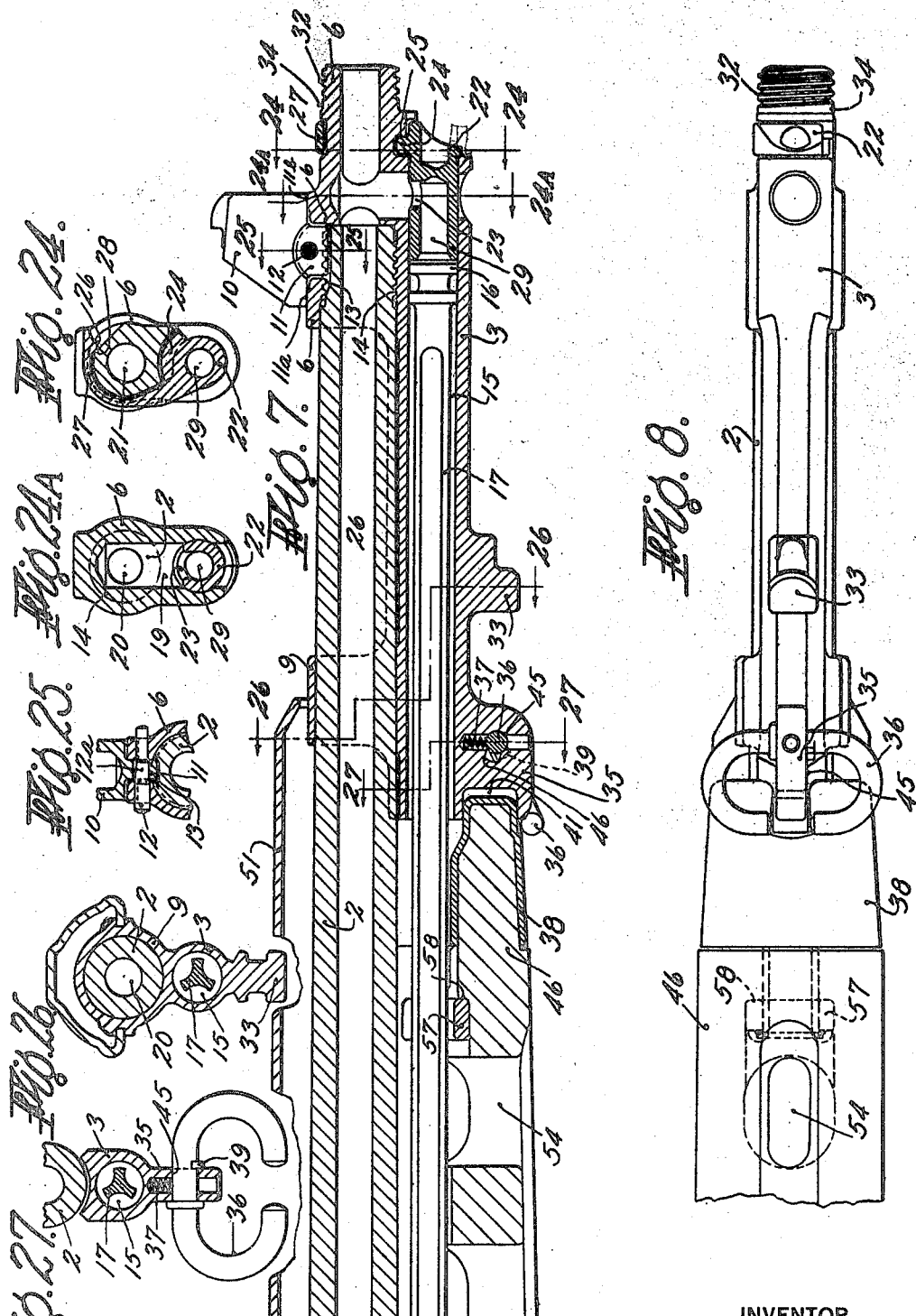

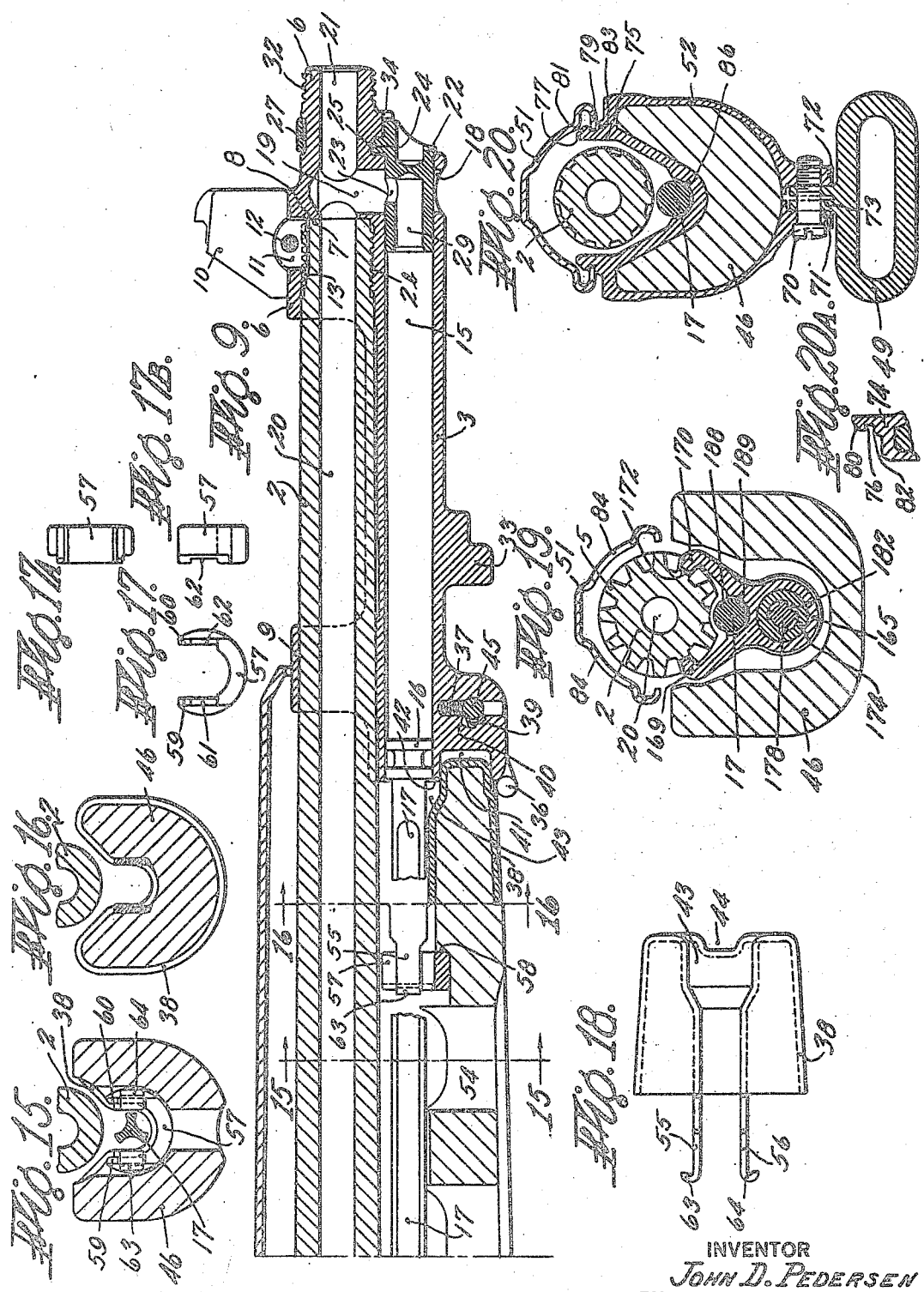

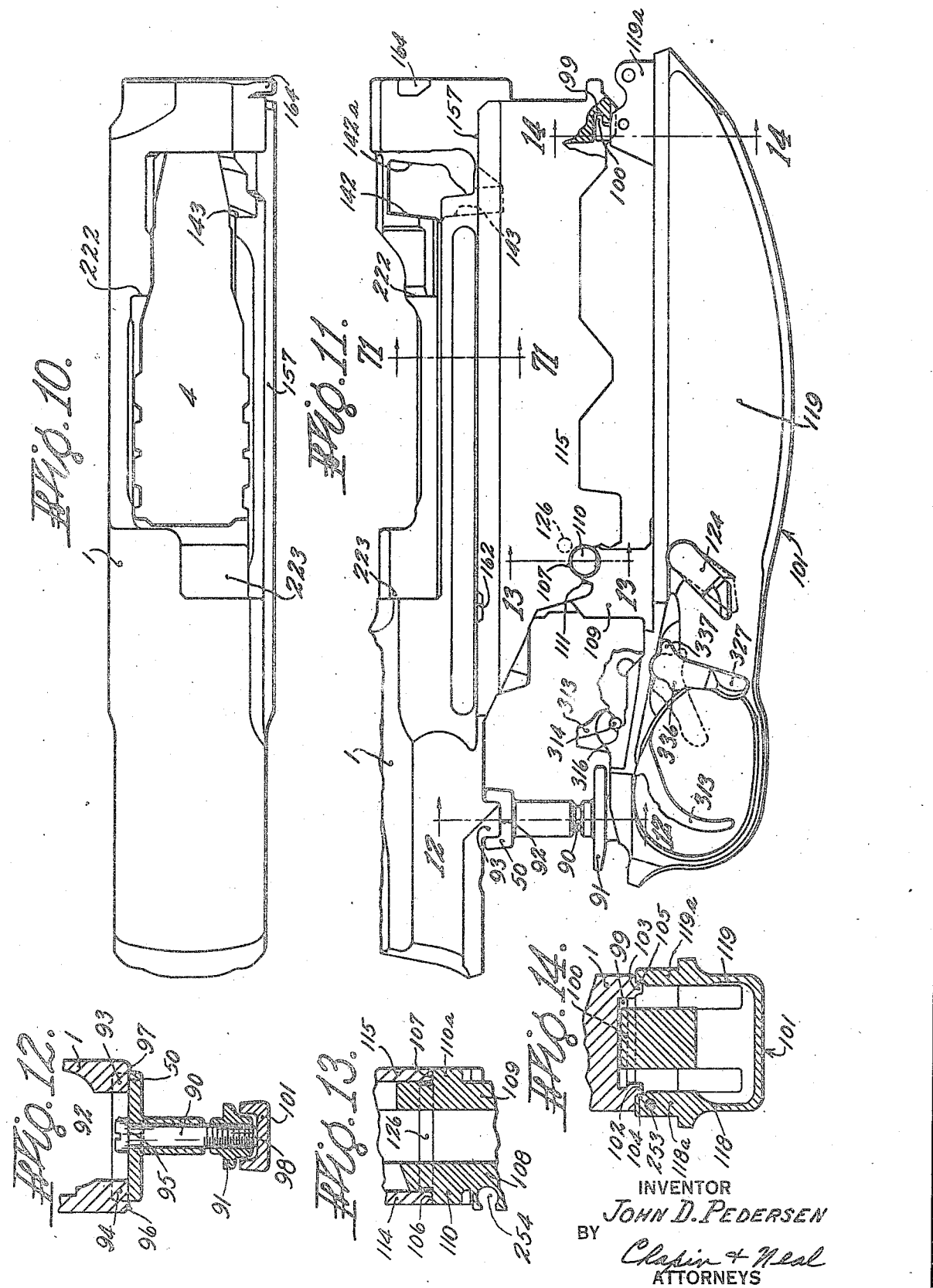

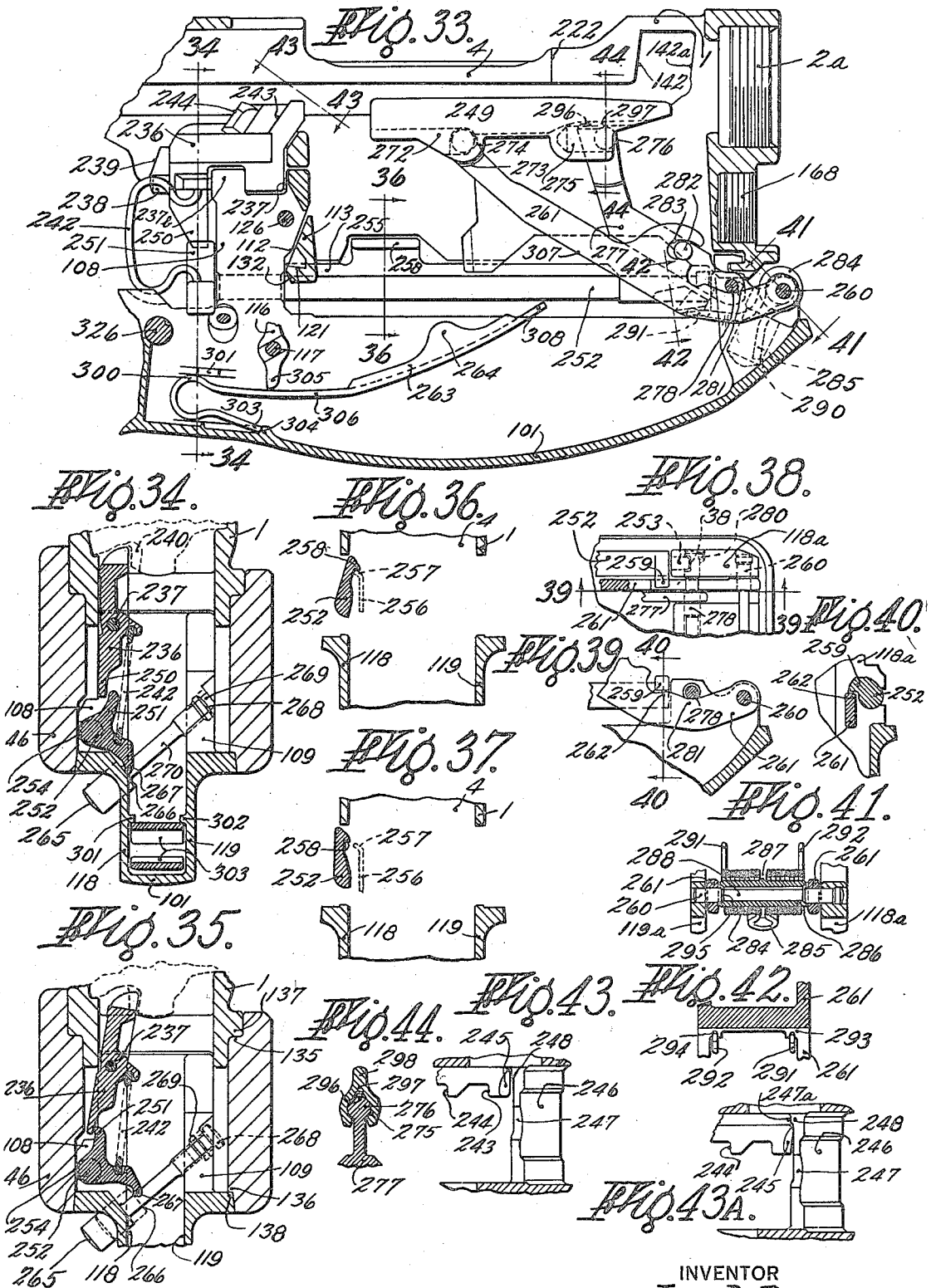

Sept. 28, 1943.  J. D. PEDERSEN  2,330,737
RIFLE MECHANISM
Filed July 29, 1939  14 Sheets-Sheet 10
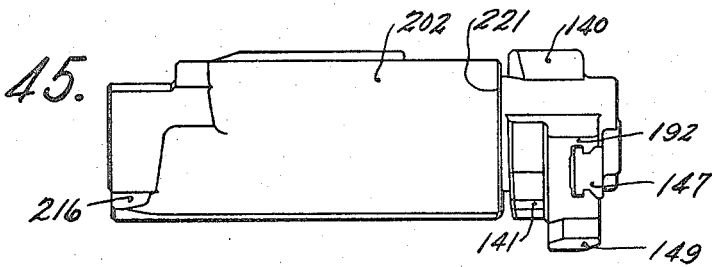
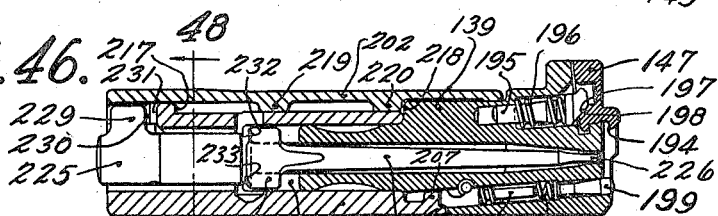
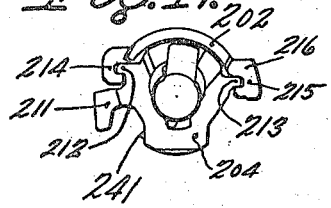
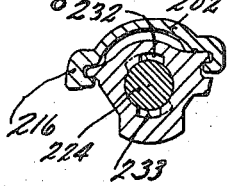
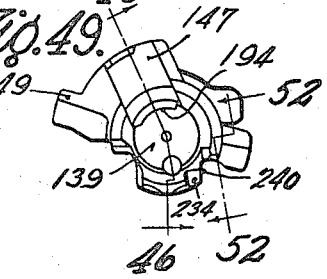
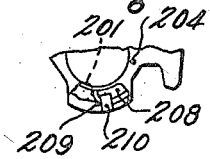
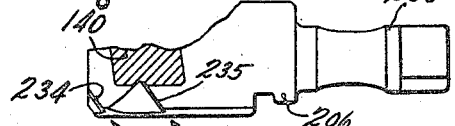
INVENTOR
JOHN D. PEDERSEN
BY Chapin & Neal
ATTORNEYS

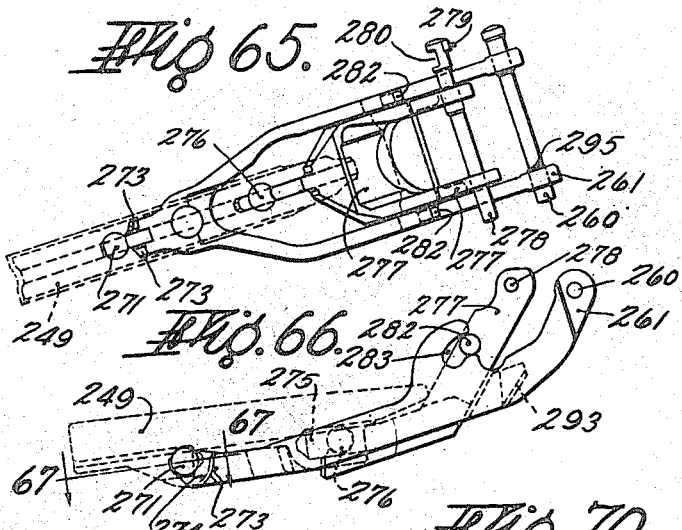

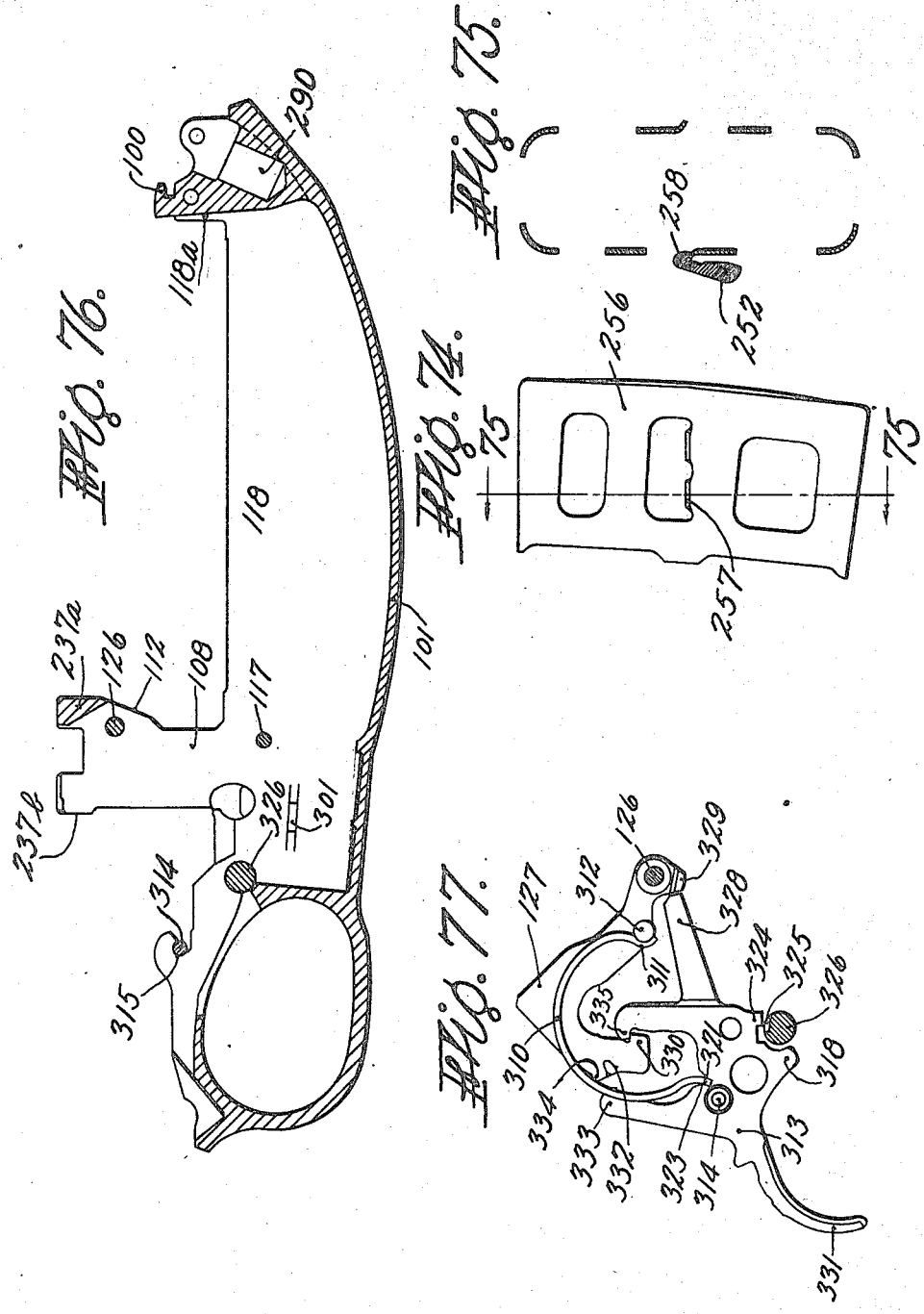

Sept. 28, 1943.   J. D. PEDERSEN   2,330,737
RIFLE MECHANISM
Filed July 29, 1939   14 Sheets-Sheet 14
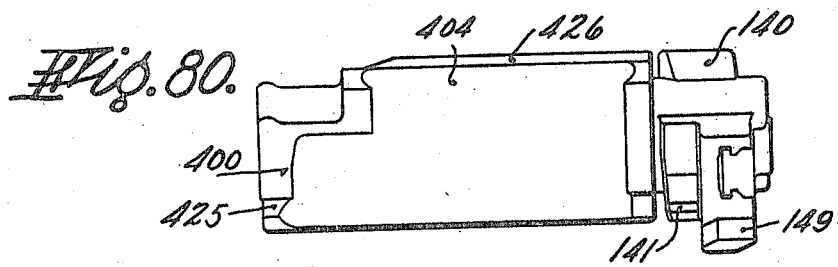
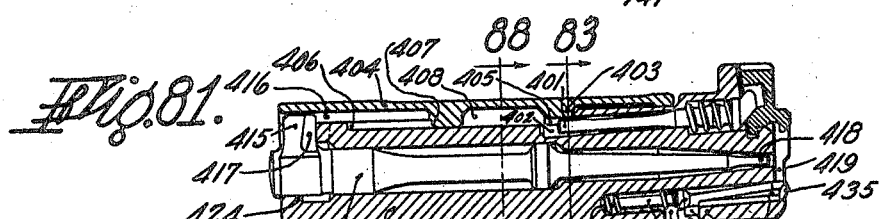
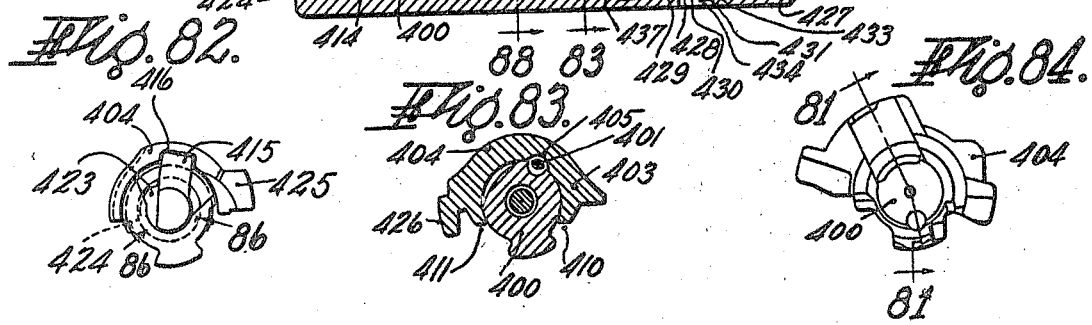
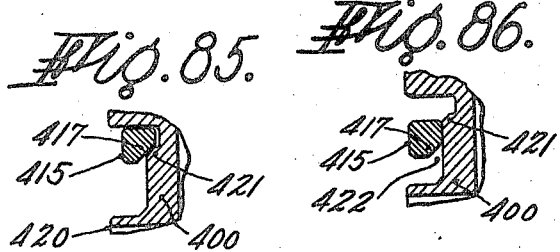
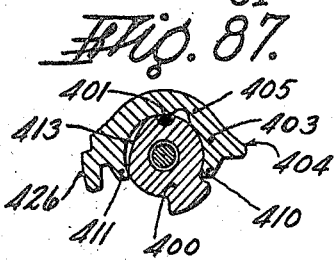
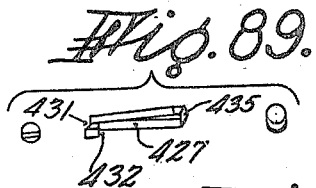
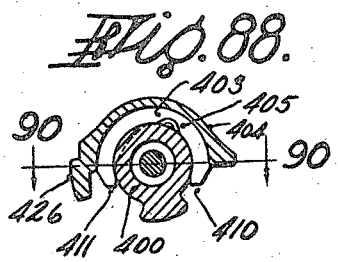
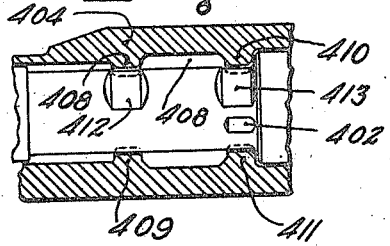
INVENTOR
JOHN D. PEDERSEN
BY
Chapin & Neal
ATTORNEYS

UNITED STATES PATENT OFFICE 2,330,737

RIFLE MECHANISM

John D. Pedersen, Jackson, Wyo.

Application July 29, 1939, Serial No. 287,221

4 Claims. (Cl. 42—50)

The present invention is for improvements in rifles of the semi-automatic type such as previously patented to me, No. 1,737,974, dated December 3, 1928. The embodiment herein shown is designed for use as a military weapon and has many constructional features which facilitate an easy assembly and disassembly of its parts without special tools and also makes possible quantity manufacture of the same at low cost.

As distinguished from the rifle of my aforesaid patent, the power for operating the breech mechanism herein, is obtained from discharge gases at the muzzle of the barrel which in general is a well-known principle of operation for such rifles but which in the present invention is employed in a manner to gain certain advantages from the form of the construction used. For example, the piston rod in the gas operating cylinder is made easily detachable and of such form and shape that it may be conveniently used by the soldier as part of his cleaning rod for the rifle. In addition, the gas ports and passages are made readily accessible for easy cleaning.

The magazine feed mechanism, enbloc clip, clip handling mechanism, and bolt control mechanism herein, all follow the same principles of operation as described in my previous rifle of the patent referred to but the details of construction have been modified in certain particulars in the direction of simplicity and low cost. The enbloc clip for the present rifle is of the double row reversible type and the staggered rows of cartridges therein may be in either right or left hand disposition without disruption of the feed mechanism which handles them one way as well as the other. The follower mechanism for this purpose is a simplification and an improvement over the construction shown in my previous Patent No. 1,804,511, dated May 12, 1931.

The bolt mechanism of my present improved rifle is of the combined rotary and reciprocatory type, being rotated between locked and unlocked positions and being reciprocated for opening and closing the breech and magazine chamber. It is presented herein in two alternate forms, one of which is an assembly of cover, carrier and bolt and the other merely an assembly of cover and bolt, this second form showing a cover which combines its own functions with that of a carrier. Both of these forms present a substantially smooth uninterrupted closure for the breech to prevent the intrusion of dirt.

The breech mechanism except for the bolt, but including the magazine feed, and appurtenances thereto, are all carried on and removable with the guard, and therefore to render these parts readily accessible, the guard is made detachable by hand from the receiver. In the present improvement, the guard, when attached to the receiver, also acts to secure the wooden stock of the rifle in place, and said stock when the guard is dismounted may be swung away from the breech and barrel and also dismounted. The means for manual attachment of the guard to the receiver requires a snap catch action of precision character. Consequently, the intervening wooden stock which expands and contracts in different climates must be prevented from disrupting the precision attachment of the guard to the receiver. For this purpose, I have provided in the present rifle a specially constructed anchor device of metal which extends through the stock and to which the latter may be adjustably clamped. This anchor device acts as a definite and constant spacer of fixed length between the guard and receiver regardless of any expansion or shrinkage of the intervening wooden stock. With this construction, the stock of the rifle need never be loose and the guard can always be manually snapped into securing attachment to the receiver with the same facility.

Further improvements in details and general construction of the rifle will become apparent from the following description taken in connection with the accompanying drawings, in which:

Fig. 1 is a top view of the rifle;

Fig. 2 is a right side view of the rifle;

Fig. 3 is a longitudinal section through the receiver and part of the stock and barrel showing the bolt mechanism in breech closing position;

Fig. 4 is a similar longitudinal section through the receiver and part of the stock and barrel showing the bolt mechanism in the open and fully retracted position;

Fig. 5 is a longitudinal section through the barrel, stock, slide, etc., taken just ahead of and matching on Fig. 3;

Fig. 6 is a longitudinal section through the barrel, stock, slide, etc., taken just ahead of and matching on Fig. 4;

Fig. 7 is a longitudinal section through the barrel, stock, cylinder, etc., taken just ahead of and matching on Fig. 5;

Fig. 8 is a bottom view of the parts shown in Fig. 7;

Fig. 9 is a longitudinal section through the barrel, stock, cylinder, etc., taken just ahead of and matching on Fig. 6;

Fig. 10 is a top view of the receiver with rear sight omitted;

Fig. 11 is a right side view of the guard assembled to the receiver, the intervening stock being omitted;

Fig. 12 is a section through the receiver, anchor, and guard, on section line 12—12 of Fig. 11;

Fig. 13 is a section through a portion of the guard and the receiver on section line 13—13 of Fig. 11;

Fig. 14 is a section through a portion of the guard and the receiver on line 14—14 of Fig. 11;

Fig. 15 is a fragmentary section on line 15—15 of Fig. 9;

Fig. 16 is a fragmentary section on line 16—16 of Fig. 9;

Figure 78:
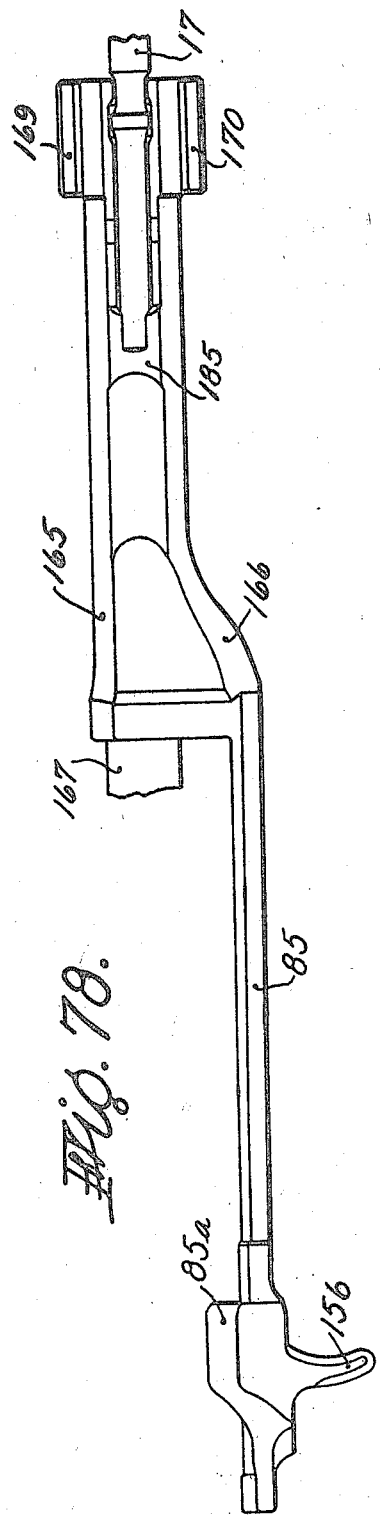
Figure 79:
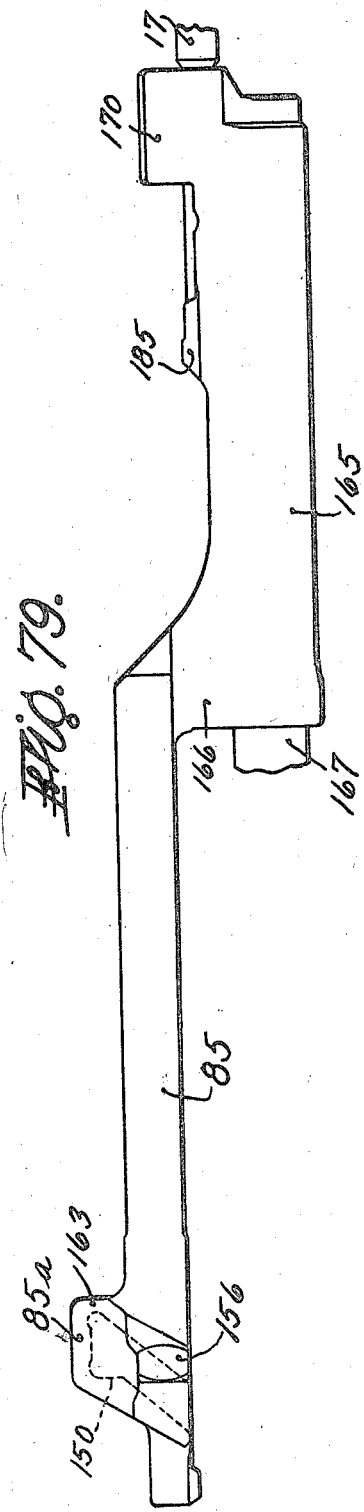

Figs. 17, 17A, and 17B show respectively the rear end top, and right side of the ferrule thimble 57 of Figs. 7 and 9;

Fig. 18 is a top view of the ferrule 38 of Figs. 7 and 9;

Fig. 19 is a section on line 19—19 of Fig. 5;

Fig. 20 is a section on line 20—20 of Fig. 5;

Fig. 20A is a detail section slightly enlarged of the cage engaging lug 74 of Fig. 20;

Fig. 21 is a section on line 21—21 of Fig. 5;

Fig. 22 is a section on line 22—22 of Fig. 3;

Fig. 23 is a fragmentary section on line 23—23 of Fig. 5;

Figs. 23A and 23B show respectively the front view and a longitudinal section through the action spring collar 174 of Figs. 5 and 6;

Fig. 24 is a section on line 24—24 of Fig. 7;

Fig. 24A is a section on line 24A—24A of Fig. 7;

Fig. 25 is a section on line 25—25 of Fig. 7;

Fig. 26 is a section on line 26—26 of Fig. 7;

Fig. 27 is a section on line 27—27 of Fig. 7;

Fig. 28 is a fragmentary section on line 28—28 of Fig. 4;

Fig. 29 is a fragmentary section on line 29—29 of Fig. 4;

Fig. 30 is a fragmentary right side view of the guard showing the assembling position of the hook pin 117;

Figs. 31 and 31A show respectively the top and right side views of the hook;

Figs. 32 and 32A show respectively the rear and right side views of the hook;

Fig. 33 is a fragmentary longitudinal section through the receiver and guard in assembled relation, showing the cartridge feeding mechanism, the latch, bolt stop, kicker, etc.;

Fig. 34 is a fragmentary section on line 34—34 of Fig. 33, showing the latch in its clip retaining position, and the bolt stop clear of the bolt;

Fig. 35 is a fragmentary section on line 34—34 of Fig. 33, showing the latch in its clip clearing position and the bolt stop in the path of the bolt;

Fig. 36 is a fragmentary section on line 36—36 of Fig. 33, with a fragment of the clip added thereto, showing the latch retaining the clip;

Fig. 37 is a view similar to Fig. 36, showing the latch clearing the clip;

Fig. 38 is a fragmentary top view at the front end of the guard showing the latch, lever, rocker, etc., in Fig. 33;

Fig. 39 is a fragmentary longitudinal section on line 39—39 of Fig. 38;

Fig. 40 is a fragmentary section on line 40—40 of Fig. 39;

Fig. 41 is a fragmentary section on line 41—41 of Fig. 33;

Fig. 42 is a fragmentary section through the lever 261 on line 42—42 of Fig. 33;

Fig. 43 is a fragmentary section through the receiver on line 43—43 of Fig. 33. This view shows the bolt stop in its non-stopping position;

Fig. 43A is a view similar to Fig. 43 to show the bolt stop in its stopping position;

Fig. 44 is a section through the follower and rocker connection on line 44—44 of Fig. 33;

Fig. 45 is a top view of the bolt assembly;

Fig. 46 is a section through the bolt assembly generally on line 46—46 of Fig. 49;

Fig. 47 is a rear end view of the bolt assembly, the bolt being in its unlocked position;

Fig. 48 is a section on line 48—48 of Fig. 46;

Fig. 49 is a front end view of the bolt assembly, the bolt being in its unlocked position;

Fig. 50 is a fragmentary view of the carrier front end, showing in dotted lines the position of the ejector plunger when the bolt is in the unlocked position;

Fig. 51 is a similar fragmentary front view of the carrier. In this view the ejector plunger (dotted) is in the position for detaching the bolt from the carrier;

Fig. 52 is a fragmentary section on line 52—52 of Fig. 49 to give a side view of the bolt stop shoulders;

Fig. 52A is a projected view of the stopping shoulders of Fig. 52 looking in the direction of the dotted projection lines connecting said figures;

Fig. 52B is a rear end view of the bolt shown in Fig. 52;

Fig. 53 is a section on line 53—53 of Fig. 3. In this position the bolt is locked;

Fig. 54 is a section on line 54—54 of Fig. 3. In this position the bolt is locked;

Fig. 55 is a section on line 55—55 of Fig. 4. In this position the bolt is unlocked;

Fig. 56 is a section on line 56—56 of Fig. 4. In this position the bolt is unlocked;

Fig. 57 is a fragmentary unrolled section on line 57—57 of Fig. 54, showing the firing pin in its retracted position;

Fig. 58 is a fragmentary unrolled section on line 58—58 of Fig. 56, showing the firing pin in its retracted position;

Fig. 59 is a fragmentary unrolled section on line 59—59 of Fig. 69, showing the fully locked position of the bolt;

Fig. 60 is a fragmentary unrolled section similar to Fig. 59, but showing the bolt in nearly its unlocked position;

Fig. 61 is a fragmentary unrolled section on line 61—61 of Fig. 70, showing the fully unlocked position of the bolt;

Fig. 62 is a fragmentary unrolled section on line 62—62 of Fig. 69, showing the left lug of the bolt in the locked position;

Fig. 63 is a fragmentary unrolled section similar to Fig. 62, but showing the bolt in nearly its unlocked position;

Fig. 64 is a fragmentary unrolled section on line 64—64 of Fig. 70, showing the bolt fully unlocked;

Fig. 65 is a top view of the follower or cartridge elevating mechanism detached from the guard;

Fig. 66 is a right side view of the cartridge elevating mechanism;

Fig. 67 is a fragmentary section on line 67—67 of Fig. 66;

Fig. 68 is a fragmentary section on line 68—68 of Fig. 3;

Fig. 69 is a fragmentary section through the receiver near its front end, to show the front end view of the bolt in its locked position;

Fig. 70 is a fragmentary section through the receiver near its front end, to show the front end view of the bolt in its unlocked position;

Fig. 71 is a fragmentary section on line 71—71 of Fig. 11 through the right side of the receiver, a section of the rear end of the slide being added thereto to show its engagement with the receiver;

Figs. 72 and 73 are explanatory sections along line 72—72 of Fig. 4 to show the relation of the follower to differently filled clips;

Fig. 74 is a left side view of the cartridge clip;

Fig. 75 is a sectional view thereof along line 75—75 of Fig. 74;

Fig. 76 is a detached view of the guard, in longitudinal section;

Fig. 77 is a detail view of trigger and hammer in cocked position;

Fig. 78 is a top view of the slide;

Fig. 79 is a side view of the slide;

Fig. 80 is a top view of the assembled bolt and carrier of alternate construction. The bolt is in the unlocked position;

Fig. 81 is a section on line 81—81 of Fig. 84;

Fig. 82 is a rear view of the assembled bolt, in the unlocked position;

Fig. 83 is a section on line 83—83 of Fig. 81;

Fig. 84 is a front view of the assembled bolt;

Fig. 85 is a fragmentary unrolled section on line 86—86 of Fig. 82, but with bolt locked and firing pin forward;

Fig. 86 is a fragmentary unrolled section on line 86—86 of Fig. 82, showing the bolt unlocked and the firing pin retracted;

Fig. 87 is a section on line 83—83 of Fig. 81, but with the bolt turned to its position ready to detach from the cover;

Fig. 88 is a section on line 88—88 of Fig. 81;

Fig. 89 is a group view showing respectively from left to right, the rear, right side, and front of the ejector; and Fig. 90 is a fragmentary section through the carrier on section line 90—90 of Fig. 88 and showing top of bolt.

RECEIVER GROUP

Referring more particularly to Figs. 1 and 2 of the drawings, the receiver group comprises the receiver 1, the barrel 2, the cylinder 3, and the front sight 10, all intended to be permanently fixed together, but which may be separated by proper tools. The rear sight 30 is also mounted on the receiver but its detailed mechanism is not shown in the present case as it forms the subject of a concurrently pending application.

The shape of the receiver is shown more clearly in Figs. 10 and 11, and its forward end is formed with a well-like passage 4 therethrough, constituting the magazine chamber adapted to receive a clip of cartridges, as indicated in dotted lines in Figs. 3 and 4. The barrel 2 is screw-threaded into the receiver as indicated at 2a, and its rear portion is formed with cooling ribs 5, as described in my former Patent Number 1,789,835.

At the front end of the barrel is screwed thereon at the threads 2b the muzzle piece 6 which is formed as an integral offset from the forward part of the gas cylinder 3, said cylinder extending rearwardly therefrom directly under and parallel to the barrel as shown in Figs. 2, 7, and 9. The muzzle piece carries a rear shoulder 8, which permanently and firmly abuts against the muzzle end 7 of the barrel, as shown in Figs. 7 and 9. The area of the abutting surface is shown at 14 in Fig. 24A. A strap 9 integral with the cylinder 3 surrounds the barrel 2 and secures the rear end of the cylinder to the barrel. Depending from the cylinder 3 below the strap 9, is an integral boss 35 which carries the stacking swivel and receives the forepart of the stock as will be described. The cylinder 3 is bored out as at 15, thereby forming the gas pressure chamber in which is guided the piston 16 of the piston rod 17.

The front sight 10 is mounted on the muzzle piece 6 and has an integral depending blade 11 which is secured to said muzzle piece by a locking pin 12 as shown in Figs. 7, 9, and 25. The lower end of the blade 11 extends through a slot of the muzzle piece and occupies a groove 13 cut into the threads 2b of the barrel, thereby locking the muzzle piece and cylinder against rotation on the barrel. As shown in Figs. 7 and 9, the front sight 10 is bottomed on two longitudinally spaced flat seats 11a and 11b which are formed on the top of the muzzle piece 6. Aligned perforations are formed through the slot sides of the muzzle piece and the depending blade 11. The sight 10 is wedged and held rigidly down to said seats by the locking pin 12 which as shown in Fig. 25 has a tapered middle portion extending through the hole in blade 11 and straight cylindrical end portions for a driving fit in the holes of the muzzle piece 6.

A bullet passage 21 is drilled longitudinally through the muzzle piece 6 in perfect axial alignment with the bore 20 of the barrel 2 and this alignment once formed will never be disturbed because of the rigidity and precision character of the fastening between the muzzle piece 6 and barrel 2 afforded by the screw threads 2b, strap 9, and shoulder abutment 14.

An intersecting gas passage in the form of a vertical cylindrical hole 19 is drilled through from the under side of the cylinder 3 into but not through the top side of the muzzle piece 6 so as to intersect at right angles both the chamber 15 of the cylinder and the bullet passage 21 of the muzzle piece. The hole 19 is located just forward of the muzzle end 7 of the barrel, and is slightly larger in diameter than passage 21 so as to provide an annular space around a bullet passing said intersection for conducting the propelling gas down through said hole 19 and into the pressure chamber 15. The bottom end of hole 19 is open at 18 for purposes of access in cleaning as will be described.

A removable closure in the form of a hollow cylindrical plug 22 closes the front end of the pressure chamber 15 and the opening 18. This plug 22 is provided with an interior passage 29 and a gas port 23, to control the passage of gas from the bullet passage 21 through hole 19 and into the compression chamber 15, to impinge upon the piston 16 of the rod 17, as shown in Figs. 7 and 9. The size of the gas port 23 is suitable to allow the desired amount of propelling gas to enter the pressure chamber 15 as the bullet leaves the muzzle 7 of the barrel 2. Any adjustment of the gas port 23 desired for different ammunition is obtained by replacing the plug 22 for one having the desired size of gas port. The bullet partially seals the passage 21 during its travel therethrough, thus extending the period of gas pressure upon the piston 16. This gas pressure upon the piston 16 moves the rod 17 rearwardly to effect the opening cycle of the breech action, as will hereinafter be described.

In the opening cycle the rod 17, whose mid portion is fluted to decrease its weight, moves from the position shown in Figs. 5 and 7 to that shown in Figs. 6 and 9.

The cylinder plug 22 carries a lug 24 which engages in a slot 25 of the muzzle piece 6 as shown in Figs. 7, 8, 9 and 24 to hold the cylinder plug against forward movement. The cylinder plug has integral therewith a spring hoop handle 27 adapted to embrace the muzzle piece 6 and is detached by springing the lip 26 of said handle 27 out of engagement from the shoulder 28 of the muzzle piece, as shown in Fig. 24. The cylinder plug is then turned counter-clockwise by means of its handle 27 until the lug 24 is free from the shoulder 25, after which the cylinder plug may be drawn forward out of the cylinder. The gas passage 29 and gas port 23 of the cylinder plug may then be easily cleaned. The vertical hole 19 of the muzzle piece may also be easily cleaned through its bottom opening 18. When the rod 17 is removed, in the manner hereinafter described, through the front end of the cylinder 3, the gas chamber 15 may then be easily cleaned from the front, in the manner employed to clean and oil the bore of the barrel.

The piston rod 17 is easily detachable and is designed to be used as the principal member to provide a cleaning rod for the rifle, by screwing onto the threaded rear end 31 of the rod a suitable rag holder or brush member (not shown). A handle (not shown) may be attached to the piston end of the rod 17 when the latter is used as a cleaning rod for the rifle.

Heretofore, gas operation of rifles has been objectionable in that the gas port, pressure chamber, etc., were not readily accessible for cleaning, although the satisfactory performance of such firearms is largely dependent upon proper care being given these crucial points. In my new rifle, the soldier must detach the cylinder plug in order to remove the rod to obtain the cleaning rod for his rifle, thus making readily accessible for cleaning the several gas passages, gas port, and pressure chamber. It follows that these crucial points will therefore be cleaned as frequently as is the case with the bore of the barrel, thus eliminating one of the principal objections to a gas operated firearm.

The front end of the muzzle piece 6 is threaded externally as at 32, so that an attachment may be screwed thereon to cause the automatic operation of the arm when firing blank cartridges. On the bottom side of the cylinder 3 is a T-shaped lug 33 as shown in Figs. 2, 7, 8, 9, and 26. This lug, together with a front end shoulder 34 of the muzzle piece 6 form the points for a bayonet attachment.

The strap 9 and depending boss 35 both preferably integral with the rear end of the cylinder 3 serve the function of an upper band in holding the forepart of the stock 46 to the barrel 2 in the manner to be described. The rear side of the boss 35 is formed with a vertical notch 41 adapted to receive the ferrule 38 which caps the front end of the stock 46 (see Figs. 7, 9, and 18). The ferrule 38 has a U-shaped socket recess 43 to receive and embrace the tubular rear end 42 of the cylinder 3 (Fig. 18) and a horizontal notch 44 at the front end of the ferrule embraces the sides of the depending boss 35. The above arrangement forms an extensible mortise joint for firmly holding the forepart of the stock in operative relation to the cylinder and barrel during any expansion of the barrel by heat.

The stacking swivel 36 is mounted in the boss 35 without any screw and in a manner to prevent rattling. It consists of an appropriately bent piece of wire as shown in Fig. 27 adapted for insertion through a perforation 45 in the depending boss 35. The swivel 36 has a key lug 39 adapted to pass through a key way 40 of the perforation 45 for the assembly of the swivel therein. A coiled spring 37 is housed in the boss 35 to bear on the swivel shank and keep it from rattling. When the stock 46 and its ferrule 38 are held in assembled position to the barrel as shown in Fig. 7, the stacking swivel 36 may not be turned back far enough to register its key lug 39 with the key way 40 and in this way the stacking swivel is retained in its boss 35.

STOCK GROUP

The stock group consists of stock 46, butt plate 47, sling swivels 48, 49, anchor 50, cage 51, lower band 52, ferrule 38 and appurtenances. The term stock 46 has reference to the wood portion or portions which extend from the butt 47 to the upper band 9. In the present embodiment it is preferably of one piece and the forepart thereof between the upper and lower band serves as a hand guard when grasping the rifle in the use of the bayonet. The stock 46 is cut away from contact with the barrel 2 and is provided with air holes 53 and 54, Figs. 5, 6, 7, 8, and 9, to aid in cooling the barrel.

The ferrule 38 may be of stamped metal as shown more particularly in Fig. 18. It is formed with a cap portion which tightly fits the front U-shaped end of the stock (Fig. 16), and is securely fastened in position by two rearwardly extended shanks 55 and 56 with hooked ends 63 and 64 which are adapted to engage the rear notches 61 and 62 of a U-shaped thimble 57 (Figs. 8 and 9).

The thimble 57 seats in a U-shaped shouldered recess 58 of the stock, located at the rear of the ferrule and is shown in detail in the three views of Figs. 17, 17A, and 17B. Its rear edges 59 and 60, are notched at 61 and 62, to receive the hooked ends 63 and 64 of the ferrule shanks 55 and 56 and prevent them from slipping laterally with relation to said thimble 57.

The lower band 52, particularly shown in Fig. 20, is split at its lower part to permit its being sprung outward so that it can be assembled onto the stock 46. When so assembled it occupies recesses 65 and 66 in the interior and exterior of the stock as shown in Figs. 5 and 6. The split portion of the lower band comprises lips 71, 72 to receive a split tongue 73 of the sling swivel 49. A screw 70 draws the lips 71 and 72 of the lower band toward each other, and at the same time compresses the split tongue 73 of the sling swivel. This compression by the screw 70 prevents rattle of the sling swivel.

As the barrel may become very hot in rapid fire, its top, as far forward as the upper band 9, is covered by the cage 51 to protect the soldier from burns. Air holes 84, Figs. 1 and 2, allow hot air to escape from the barrel. The central rib of the cage, Figs. 1 and 2, deflects the rising hot air from the line of sight and from interference with the soldier's aim. The cage also covers the bar 85 of the slide as shown particularly in Figs. 21 and 22. The rear end of the cage is formed with a downwardly turned end flange 87, Figs. 3 and 4, which occupies the groove 88 of the barrel, thus holding the cage against end movement. The rear end of the cage has inwardly turned side projections (not shown) for being secured to the barrel by being snapped downward, in the manner described in my U. S. Patent No. 1,789,835.

As shown in Figs. 20 and 20A the top of the lower band carries two upright lugs 74, 75, each provided on its outer face with a notch, the upper sides of which flare outwardly by bevels 76, 77. The middle portion of the cage 51 is provided with two inwardly turned side flanges 78, 79, which are snapped down over the cam angles 80, 81 on the top of the lugs 74, 75. The cage is made of resilient material so that its contracting flanges 78, 79 are drawn downward by the bevels 76, 77 to a firm seat on the top surfaces 82, 83 of the lower band 52. The lower band recess 86 and the bottom of the barrel loosely guide the piston rod 17 (Fig. 20).

In a similar manner to that just described the front end of the cage 51 is detachably secured to the upper band 9. As shown in Fig. 26 each side of said band 9 is formed with a notched projection such as 67 to receive inwardly turned flanges 68, 69 of the cage 51.

The anchor 50, Figs. 3, 4, 11 and 12, is seated in a transverse slot 89 of the stock 46. The anchor screw 90 drawing against the anchor nut 91 secures the anchor firmly to the stock. The anchor carries a transverse slot 92 which fits the recoil lugs 93, 94 of the receiver 1 and holds the receiver against recoil or end movement with respect to the stock (Figs. 11 and 12).

The head 95 of the anchor screw 90 draws against the bottom of the anchor slot 92. The lower faces 96, 97 of the receiver recoil lugs 93 and 94 bear against the same surface of the anchor slot. As the underhead length of the anchor screw may be accurately fabricated it follows that the distance from the faces 96, 97 of the receiver recoil lugs 93, 94 to the lower end 98 of the anchor screw is constant (when the stock is firmly clamped between the anchor 50 and the anchor nut 91), regardless of the expansion or shrinkage of the wooden stock. As the lower end 98 of the anchor screw forms a stop for the rear end of the guard, Figs. 3, 4 and 12, a spacer of constant length is thereby provided as between the rear ends of the receiver and of the guard. This arrangement enables the detachable guard to be assembled to the receiver with uniform precision regardless of expansion or shrinkage of the wooden stock.

RECEIVER AND GUARD ASSEMBLY

The receiver is provided with a transverse groove 99 near its front end, into which the tenon 100 of the guard 101 engages as in Fig. 11. The receiver also carries a pair of ribs 102, 103 which project downwardly between the side wall shoulders 104, 105 of the guard 101 to hold the guard in correct lateral alignment with the receiver, Fig. 14. The receiver is formed with a pair of sockets 106, 107, Figs. 11 and 13, which open downwardly and rearwardly. Two trunnions or laterally projecting pins 110, 110a on rear vertical extensions 108, 109 of the guard engage in the sockets 106, 107, to accurately position the guard with respect to the receiver. The length of the anchor screw 90 is such that the rear end of the guard abuts the end 98 of the anchor screw just before the guard trunnions 110, 110a are moved upward to their seats in the receiver sockets 106, 107. When the trunnions are moved upward to their seats, the rear end of the guard, having a limited flexibility, is sprung slightly with respect to the remainder of the guard. As the trunnions 110, 110a are moved upward to their seats in the receiver sockets 106, 107, the guard tenon 100, having previously been entered into the receiver groove 99 is moved forward to full engagement with the receiver groove, due to the forwardly inclined path of the guard trunnions as controlled by a pair of cam surfaces such as 111, which lead into sockets 106, 107, Fig. 11. When the guard trunnions 110, 110a are moved downwardly out of the receiver sockets 106, 107, the guard at the same time is moved toward the rear, as controlled by the cam surface 112 of the guard wall 108 riding on the inclined cam surface 113 of the receiver, see Fig. 33, thus withdrawing the tenon 11 from the receiver groove 99. The rear end of the guard is positioned laterally in the receiver by having its rear vertical extensions 108, 109 engaged between the receiver side walls 114, 115 as shown in Figs. 11 and 13.

The latch hook 116, Figs. 32 and 32A, for retaining the guard in place, is detachably carried on the hook pin 117, Figs. 31 and 31A, which is pivotally mounted between the side walls 118, 119 of the guard. The face 120 of the latch hook engages over the notch shoulder 121 of the receiver, Figs. 3 and 4, to hold the guard firmly upward in the receiver. The hook face 120 is a slow cam with "draw" sufficient to tighten the guard to the receiver despite small variations as between the affected surfaces. The latch hook is provided with a slot 122 occupied by the key 123 integrally formed on the hook pin 117 so that the latch hook may be rocked by means of the outside handle 124 on the hook pin 117. Fig. 11 shows in solid lines the handle 124 in the position of the latch hook engaged with the notch shoulder 121 of the receiver, and the handle (dotted) in the position of the latch hook disengaged from the shoulder 121 of the receiver preparatory to detaching the guard from the receiver. Fig. 30 shows (dotted) the handle 124 in the position of assembling the hook pin to the guard and the latch hook. In this position the hook pin key 123 is aligned to pass through a keyway 125 of the side wall 119 and engage in slot 122 of the latch hook, the upper end of said hook having been swung forward and downward. After the hook pin has been assembled, the upper end of the latch hook is rotated back to the vertical position, after which the hammer 127 is assembled on its pivot 126 in the guard. The hammer, in place, prevents the hook lug 128 from again swinging forward sufficiently to allow the detachment of the hook pin and latch hook. In its operative position the hook pin is held from end movement by the shoulders of the hook pin key 123, being against the side wall 119 of the guard and out of register with the keyway 125 of the guard. The latch hook is provided with an incline 131 which is "ridden down" by the incline 132 of the receiver, when the guard is being assembled to the receiver. One end 133 of a double ended spring 134 engages a notch seat 130 in latch hook 116 and constantly forces the hook into engagement with the notch shoulder 121 of the receiver, Figs. 3 and 4.

The tenon 100 of the guard, engaged in the slot 99 of the receiver, forms a fulcrum around which the guard swings as its rearward end is assembled upward into the receiver. This swinging of the guard provides a leverage to compress the stock shoulders 135, 136 between the receiver shoulders 137 and the guard shoulders 138, see Fig. 35.

BREECH ACTION

The breech action comprises a reciprocable and rotatable bolt 139 which is provided with a pair of oppositely located breech locking lugs 140, 141, Fig. 45, adapted to lock ahead of the receiver locking shoulders 142, 143, Figs. 10 and 11. Fig. 69 is a front view of the bolt in its locked position, while Fig. 70 shows the bolt rotated to its unlocked position and ready to be moved longitudinally in the receiver 1.

The left bolt lug 140 is shown in the locked position engaged with receiver locking shoulder 142 in Fig. 62. Fig. 63 shows the left bolt lug nearly unlocked from the receiver shoulder 142. During this portion of the unlocking movement the bolt has been cammed toward the rear by the low pitch helix 142a of the receiver acting on the front end helix 144 of the left bolt lug 140. Fig. 64 shows the completely unlocked position of the bolt lug 140 which has been still further cammed toward the rear by the steep pitch helix 145 of the receiver acting on the helix 146 of the bolt lug. The two stages of camming to the rear constitute the primary extraction which, acting through the extractor 147, starts the fired case from the chamber 148 of the barrel. This primary extraction movement also serves as an easy transition from the rotary to the rectilinear motion of the bolt.

Radially extending from the front of right bolt lug 141 is the arm 149 which occupies the helical cam slot 150 in the enlarged rear end 85a of the slide bar 85 which is adapted to move longitudinally on the receiver, Figs. 69, 70, 72. Fig. 59 shows the arm 149 held downwardly by the rear helix 151 of the cam slot 150. This is the locked position of the bolt and corresponds to the position of the bolt lug 140 shown in Fig. 62, and the bolt shown in Fig. 69. Fig. 61 shows the arm rotated to its fully unlocked position by the helix 152 of the cam slot 150. This is the fully unlocked position of the bolt and corresponds to the position of the bolt lug 140 shown in Fig. 64, and the bolt shown in Fig. 70. Fig. 60 is the intermediate position in the unlocking of the bolt arm and corresponds to the bolt position shown in Fig. 63.

In the closing cycle of the breech action, when the cam slot 150 pulls the bolt forward, the squared ledge 153 of the cam slot, Fig. 61, moves forward to contact the squared back face 154 of the bolt arm 149 and to thereby pull the bolt forward without imparting a rotative tendency to the bolt. During this forward travel, the bolt is held from rotation by the left bolt lug 140 occupying the slot 155 in the receiver as shown in Figs. 64 and 70.

When the bolt reaches nearly to its forward position, its left lug helix 146 comes in contact with the helix 145 of the receiver, see Fig. 64. This contact deflects the left lug upward to the position shown in Fig. 63. This portion of the rotation of the bolt moves the bolt arm 149 downward off contact with the ledge 153 of the cam slot 150 to the position shown in Fig. 60. The continued forward travel of the slide causes the helix 151 of the cam slot 150 to ride down the bolt arm 149 to the locked position of the bolt as shown in Fig. 59, in respect of the bolt arm 149 and by Fig. 62 in respect of the left bolt lug 140.

It should be understood that the right bolt lug 141, Figs. 45, 69, 70, is freed from or is in engagement with the right receiver locking shoulder 143 shown in Figs. 10, 11 and 70, simultaneously with the freeing or engagement of the left bolt lug 140 from or with the left receiver locking shoulder 142.

The slide is shown detached in Figs. 78 and 79. It is made up of a slide bar 85 which is guided in ways on the right side of the receiver and connected by an integral offset portion 166 to a slide tube 165 which extends beneath barrel 2 as shown in Figs. 5 and 6. The slide tube is detachably connected to the piston rod 17, the forward end of which is formed into a piston 16 for working in the gas cylinder 15. Gas pressure on piston 16 gives the rearward stroke to the slide, the forward stroke being effected by the action spring 173 which is contained in the slide tube 165. At the forward end of the slide tube 165 are means for guiding the same in its reciprocable travel comprising upwardly projecting fingers or claws 169, 170 which work in ways or grooves 171, 172 at the sides of the barrel, see Figs. 5, 6, and 19. The slide tube 165 is also guided by having a telescoping movement upon the outside of the spring case 167 which is also tubular and is securely fastened by screw threaded engagement with the receiver at 168, see Figs. 3, 4, 5, and 6. The action spring 173 is contained in the case 167 and tube 165 and the details of its mounting and disassembly therefrom will be later described.

Figs. 1 and 2 show the enlarged rear end 85a of the slide bar which has upon its inner face the slide cam slot 150 shown in Figs. 59, 60 and 61, and carries the operating handle 156, Figs. 69 and 70, which serves for manual operation. A cross section of the slide bar 85 is shown in Fig. 71. As appears therein the bottom of the slide bar 85 rides along receiver rail 157 (see also Fig. 11). The rear end of the slide bar is held from rising by the lug 158 slidably engaging under the overhang 159 of the receiver, and the sliding engagement of the tooth 160 with the ledge groove 161 of the receiver holds the rear end of the slide bar in the receiver. The receiver rail 157 is notched through at 162, Fig. 11, to allow the tooth 160 to be disengaged from the ledge 161 by springing outward the rear end of the slide bar. This withdraws the slide cam slot 150 off the bolt arm 149 after which the bolt, freed from the slide bar, may be moved back out of interference with the slide bar. The slide tooth 160 may now be reentered in the notch 162 of the receiver and moved inwardly to engage with the ledge 161 after which the slide bar may be eased forward until the shoulder 163 (Fig. 79) of the slide bar is brought to rest against the stop lug 164 (Fig. 11) of the receiver. The bolt may now be moved forward and detached from the receiver.

To facilitate assembling, the action spring 173 is mounted on a guide stem 176 on whose rear end is formed a head 177. The head 177 abuts against the bottom of the spring case 167 to furnish the base for the thrust of the action spring, Figs. 3 and 4. The action spring 173 is normally confined on the stem 176 by a collar 174 slidably mounted on the forward end of the stem. When assembled in tube 165 and case 167 the spring thrust is exerted through the collar 174 against shoulder 175 of the tube 165 and constantly tends to move the slide forward. The forward portion of the stem 176 is formed with four longitudinal ribs 178 which terminate in an annular groove 179 just behind a button 180. The button 180 has a pair of oppositely disposed grooves 181, one of which is shown in Figs. 5 and 6. The grooves 181 are in alignment with two of the grooves between the ribs 178. The collar 174, shown in detail in Fig. 23A, is provided with a pair of oppositely disposed lands 182, adapted to slide over the button 180 and also back through the grooves 183 of the stem 176. In assembling, the spring 173 is put on the stem 176 and compressed. The collar 174 is entered in the grooves 181 and moved against the spring to a position clear back of the rear ends 184 of the ribs 178. The collar 174 is then given a quarter rotation on the cylindrical portion of stem 176 to register with another pair of grooves 183 and eased forward with the spring until the collar is stopped by the button 180. The collar is of sufficient length so that its lands when against the button 180 are still in control of the pair of grooves 183 which have no outlet through the button 180. This confines the spring on the stem preparatory to its assembly in the slide tube 165 and case 167. When the mounted spring is assembled in the rifle the slide tube in its forward position holds the collar 174 just back of the button 180 of the stem 176. In the rearmost position of the slide tube, Fig. 6, the collar is not back enough to be clear of the ribs 178.

On the top forward portion of the slide tube 165 is formed an abutment 185 against which bears the rounded end 186 of the piston rod 17. Fig. 23 shows the end 186 of the rod 17 confined laterally by a partial socket 187 in the slide tube which extends for a short distance forwardly of the abutment 185. The rod end 186 lies loosely in its socket 187, the portion 31 of said rod end being threaded only for the purpose of receiving a cleaning tool as previously described. Fig. 19 shows the socket cut away on top somewhat further forward, to allow the slide tube to be separated from the rod end 186. The rod is provided with an annular rib 188 which occupies a recessed portion 189 of its seat in the slide tube. The rib 188 permits a small amount of end play between the rod 17 and the slide tube. The bottom of the barrel carries a groove to clear the rod 17 and the abutment 185, see Fig. 19.

To disassemble the parts; the slide, the guard, and stock are separated first from the receiver and barrel and the cylinder plug 22 is removed from the cylinder. The rear end of the slide bar 85 is then separated from the bolt arm 149, as previously described, through the notch 162, Fig. 11, of the receiver. While retaining the rear end of the bar 85 in its "sprung out" position, the slide is eased forward clear of the lug 164, Fig. 11, of the receiver, until the rear end 190 of the slide tube 165 is far enough forward of the end 191 of the spring case 167 to allow the mounted action spring to be removed. The front end of the slide is then swung downward off the rear end 186 of the rod 17 and the latter is dropped out the front end of the cylinder 3.

*Breech closure*

The bolt 139 is rotatably mounted in a bolt carrier 204, which is slidable in the receiver 1. The extractor 147 is mounted in the bolt in a radially directed T-slot 192, Fig. 45. The T-slot slopes slightly to the rear and the movement of the extractor is rigidly controlled so that, as it moves outward from the cartridge rim the extractor claw 194 moves also slightly to the rear. This rearward inclination of the extractor path prevents the claw 194 from slipping off the cartridge rim during extraction. The extractor plunger 195 urged forward by the extractor spring 196 tends at all times, through the camming contact of face 197 of the plunger and surface 198 of the extractor, to force the extractor into engagement with the cartridge rim.

The ejector 199 is at all times urged forward by the ejector spring 200. The rear end of the spring 200 is supported by the plunger 201. The front end of the plunger furnishes a stop to limit the rearward movement of the ejector 199. A retaining pin 203 necked at its mid portion serves to retain the plunger 201 in the bolt when the bolt is separated from the carrier 204, see Figs. 3, 4, and 46.

The bolt's rear end 205 is cylindrical for being journaled in the carrier 204. The bolt is retained therein by the tooth 206 of the bolt (Fig. 52) engaging behind a lug 207 of the carrier (Fig. 46). The forward part of the lug 207 has cut therein a segmental recess 208 in which the rear end of the plunger 201 rides when the bolt is rotated from its locked to its unlocked position. Fig. 50 shows the plunger 201 (in dotted lines) against a stop end 209 of the recess 208 thus preventing the bolt from rotating beyond its unlocked position when the bolt and bolt carrier are removed from the receiver. An inclined cut 210 through the bottom of lug 207, Figs. 46, 50, and 51, allows the introduction of a pointed instrument to depress the plunger 201 against the tension of its spring 200, and thus permits the bolt to be rotated beyond its unlocked position to its disassembled position, Fig. 51, where the tooth 206 on the bolt clears the lug 207 of the carrier. The bolt may now be drawn forward out of the carrier.

The carrier 204, in which the bolt 139 is mounted, has only reciprocatory motion in the receiver. A left rib 211 of the carrier is constantly guided in the slot 155 of the receiver, Figs. 3, 4, 55, 69, 70, etc. The slot 155 also is the guide for the left bolt lug 140 when the bolt reciprocates in the receiver.

The cover 202, Figs. 1, 2, 45, 46, 53, etc., is slidably connected to the carrier 204 by the ribs 212, 213 of the carrier engaging in grooves 214, 215 of the cover. The rear end of the right rail 216 (Fig. 45) of the cover is guided by the groove 155a, Fig. 55, of the receiver when the bolt is in its forward position and the rail 216 reciprocates back in receiver groove 155a when the bolt is being opened. The cover 202 therefore, aids in the guiding of the carrier 204 in the receiver.

The cover is assembled onto the carrier prior to the bolt being assembled to the carrier. The cover has endwise movement on the carrier, between the shoulder 217 of the carrier and shoulder 218 of the bolt, Figs. 3, 4, and 46. This endwise movement is limited by the rear lug 219 and forward lug 220 of the cover, Fig. 46. When the bolt is back in its open position, the cover is moved to its forward limit on the carrier, Figs. 4, 45 and 46. As the bolt moves forward to its closed position, Fig. 3, the front left end 221 of the cover stops against the shoulder 222 of the receiver, Figs. 1, 4, 10, 11 and 33, the bolt and carrier continuing to move forward to the closed position. The cover is held forward to the stop 222 of the receiver by the shoulder 217 of the carrier, Fig. 3. The rear end of the cover thus extends to the rearward of the carrier and covers the space between the rear end of the carrier and the end 223 of the receiver opening, Figs. 1, 3, 10 and 11 when the bolt is closed.

The firing pin 224 is journaled at its rear portion in the carrier 204 and its forward reduced end 226 projects through the bolt face, and fires the cartridge in the chamber when its rear end 225 is struck by the hammer 127, Fig. 3. The rear end 205 of the bolt is slotted crosswise at 227, Figs. 52B, 53 and 55. Into this slot engages a flattened intermediate wing 228 of the firing pin. The firing pin, therefore, while it has end movement independent of the bolt, must rotate with the bolt. The rear end 225 of the firing pin has a lateral lug 229 whose forward face is provided with a helical cam 230, Fig. 46. Fig. 57 shows the position of lug 229 when the firing pin is forward in the firing position. Fig. 58 shows the position of lug 229 of the firing pin when the bolt is unlocked, the firing pin having been fully retracted by the helical cam 231 of the carrier as it rotated with the bolt to the unlocked position of the latter. The firing pin is assembled to the carrier from the rear, the flattened wing portion 228 entering through grooves 232, 233 in the bore of the carrier, Fig. 48.

The bolt is next inserted into the carrier so that the wing portion 228 is picked up by the cross slot 227 of the bolt. When the bolt is rotated to its unlocked position with respect to the carrier, Fig. 48, the rear shoulders of the wing portion 228 are rotated out of registration with the grooves 232, 233 of the carrier 204 to retain the firing pin in the carrier. The bolt is provided at its forward portion with bolt stop faces 234, 235, Fig. 52, which are adapted to be engaged by a bolt stop as hereinafter described, for holding the bolt open. The front face 234 is shown in end views, Figs. 49, 69 and 70. The rear face 235 is carved into the lower left corner of the bolt directly behind the front face 234 as shown in Figs. 52 and 52A.

MAGAZINE SYSTEM

The principal elements of the magazine system which are correlated in function to produce the desired operation, are the bolt stop, clip latch, clip ejector, and cartridge feed mechanism.

The bolt stop 236, Figs. 33, 34 and 35, is mounted in the guard 101 by the pivot pin 237, which extends between lugs 237a and 237b of the guard extension 108. The head 238 of said pin 237 is blocked by a shoulder 239 of the receiver to retain the pin 237 in place when the guard is assembled to the receiver. The bolt stop has a transverse rocking movement and also a limited endwise movement lengthwise of the guard. When the bolt is in any other than in its open position, Fig. 4, the bolt stop is held in its retired position by the smooth outside surface 240 of the bolt, see Fig. 49, and by the similar surface 241 of the carrier, Fig. 47. This retired position of the bolt stop is shown in Fig. 34. The upper end of the spring 242, Figs. 33 and 34, constantly is exerted to hold the bolt stop in its retired position. It is moved into active bolt stopping position as the result of an exhausted magazine chamber as will be hereinafter described.

When the bolt stop is in its operative position, Fig. 35, its stop faces 243, 244, (Figs. 33 and 43) are swung inward in front of the coacting faces 234, 235, Fig. 52, of the bolt to intercept the bolt and to prevent its further forward motion. When the bolt stop 236 rocks on its pivot between operative and inoperative positions, its front sloping face 245 rides on bridge wall 246 of the receiver shown in Fig. 33. As shown in the detail views, Figs. 43 and 43a, this bridge wall 246 has a sloping shoulder 248 connecting the stepped surfaces 247, 247a disposed transversely of the receiver. Consequently when the bolt stop moves into its operative position for stopping the bolt, the face 245 may rest on the forward step 247 (Fig. 43A) and when the bolt stop is retired, the face 245 must move to the rearward step 247a (Fig. 43). This endwise shift is permitted by a lengthwise play of said bolt stop on its pivot. The bolt when intercepted by the bolt stop, slides the latter slightly to its forward position (Fig. 43A) and holds it there until the bolt, through the agency of the slide handle 156 is manually retracted a slight amount in order to permit the bolt stop to slide rearwardly the necessary distance to ride over the sloping shoulder 248 to its inoperative position (Fig. 43) urged by the upper end of the spring 242. The purpose of the above construction is to prevent the release of the bolt stop merely by depressing the follower in the insertion of a new clip and without the slight pulling back of the bolt by hand. As described in my previous Patent No. 1,737,974, such a construction avoids the possibility of the operator getting his fingers pinched when recharging with a new clip. A condition precedent to the release of the bolt stop is the depression of the follower 249 from the position shown in Fig. 33, as will be later described.

The lower end 250 of the bolt stop in its retired position, Fig. 34, is immediately in the path of the arm 251 of a clip latch 252, Figs. 33 and 34, when the latch is in its clip holding position as in Fig. 36. The latch is thereby positively blocked in its clip holding position excepting when the bolt is clear open because only in that position of the bolt can the bolt stop leave its retired position. The lower end of the spring 242 constantly urges the latch to its operative position shown in Figs. 34 and 36. The latch 252 is journaled at its front end in a vertical extension 118a of the guard by a pivot 253, Fig. 38. The rear end of the latch is journaled in an open-sided bearing hole 254, in the left vertical extension 108 of the guard, Figs. 13, 34 and 35. The rear end of a blade 255 formed on the latch, Fig. 33, holds the latch from rear movement when the latch is in its assembled position.

The cartridge clip 256 shown in Figs. 74 and 75 is in general similar to the clip shown in my former United States Patent No. 1,821,526. It is designed to hold a stack of cartridges in double row staggered relation and the cartridges may be stacked therein in either a right hand or left hand disposition of the higher row. The present clip, however, has an out-turned ear 257 on the side, adapted to be engaged by the latch hook 258, and retained in the magazine well 4 as shown in Fig. 36.

The forward end of the latch is provided with a lug 259, adapted to extend into the path of shank 262 of the follower lever 261, Figs. 33, 38, 39 and 40. The lever 261 is pivoted on the pin 260 in the guard extension 118a. When no cartridges are in the magazine, the bolt being open, the follower spring 284 forces the lever 261 to the position shown in Fig. 33. In this position the shank 262 of the lever 261 has impinged against the lug 259 of the latch, see Fig. 40, to rotate the latch to its inoperative position, see Figs. 35 and 37. In said inoperative position the arm 251 of the latch has rotated the bolt stop to its operative position to lock the bolt rearward in the receiver. The latch, in moving to its inoperative position, has freed the clip, as in Fig. 37, thus allowing the clip to be ejected upward out of the receiver by the kicker 263.

The clip ejector or kicker 263 is in the form of a doubled over leaf spring and as shown in Figs. 3, 4, and 33, carries a pair of upturned flanges 264 which are in contact with the lower end of the clip, see Fig. 68. When the clip is released by the latch, as in Fig. 37, the kicker asserts itself to eject the clip upwardly out of the rifle in a manner similar to that described in my previous Patent No. 1,737,974.

When the bolt is in the open position the charged or partially charged clip may be released from the rifle by manually pressing inward on the exposed end 265 of the latch plunger to the dotted line position shown in Fig. 35. The latch plunger has a shoulder 266 which bears against the arm 267 of the latch and rotates the latch to its inoperative position as in Figs. 35 and 37. The enlarged upper end 268 of the latch plunger has its bearing in the hole 269 of the guard extension 109. This hole is slotted out rearwardly to a width equal to the reduced diameter of the plunger stem 270, as in Figs. 34 and 35. When the clip latch 252 is removed from the guard the plunger 265 may be moved upward, beyond the dotted line position of Fig. 35, when the lower end will be cleared from its bearing hole and the stem 270 of the plunger may be moved rearward from the seat 269 to detach from the guard. The latch plunger has no function in the automatic operation of the rifle.

The cartridges are fed upward through the clip in the magazine by the follower 249. Fig. 33 shows the follower elevated higher than its last feeding position in order to release the clip. The follower is formed as a single member with its upper surface shaped to provide alternatively a right hand or a left hand stepped surface for the bottom of the stack (Figs. 72 and 73). The follower is articulated by means of ball and socket joints to the upper ends of two supporting levers 261, 277 so that it may partake of a limited transverse rocking movement thereon in presenting its right hand or left hand stepped surface to the bottom of the stack as determined by the disposition of said rows in the clip. The supporting lever 261 serves an actuating lever for moving the follower upwardly in the magazine and lever 277 serves as a guide lever for controlling the inclination of the follower in its upward travel.

The follower at its under side near the rear is formed with a bearing socket 272 open to the rear and adapted to receive the spherical head bearing 271 of the lever 261 (Figs. 66 and 67). The lever 261 adjacent head 271 is formed with a shouldered neck 273, which coacts with the arcuate shoulders 274 of the follower, to retain the follower in place on the spherical head bearing 271, when the follower is in the assembled position. The front underneath end of the follower 249 is formed with a lengthwise socket bearing 275 open forwardly to receive the spherical head bearing 276 of the guide lever or rocker 277 for a pivotal and slidable movement therein. The rocker or guide lever 277 is pivoted to the guard extension 118a on a rocker pin 278, Figs. 33, 38 and 39, said pin being formed with a projection 279 which occupies a recess in said guard extension to prevent the rocker pin 278 from turning. The rocker pin has a slot 280 into which the forward end of the latch pivot 253 projects, to secure the rocker pin in its assembled position, see Fig. 38, and said rocker pin also forms a stop to limit the upward rotation of the follower actuating lever, as at 281, Figs. 33, 38 and 39.

The lever 261 is pivoted to the guard by pin 260 which is mounted between the vertical extensions 118a and 119a at the front of the guard, Fig. 41. The front lower portion of the lever is bifurcated as shown in Fig. 65. The rocker 277, also bifurcated, occupies, in part, the space between the sides of the lever 261. The rocker carries two trunnions 282 which ride in the cam slots 283 of the lever to rigidly control the varying inclination of the follower 249. The controlled inclination of the bottom cartridges as the cartridge stack is fed upward in the magazine by the follower, insures that each cartridge in turn, as it becomes the top cartridge, is presented uniformly to the chamber 148 of the barrel 2.

The follower spring 284 acts on lever 261, Figs. 33 and 41, and is a double torsion spring having an intermediate projecting loop 285. It is mounted on the follower lever pin 260 through a sleeve 286. The sleeve carries a center rib 287 which holds the spring from sliding off the sleeve, when the latter is disassembled, see Fig. 41. The sleeve 286 surrounds the lever pin 260 which is necked down along its mid section 288, and the bore of the sleeve 286 is somewhat larger than the necked down portion 288. The loop 285 of the follower spring extends into a pocket 290 formed in the guard and said spring loop 285 bears against the bottom side of said pocket 290 as a base for its action. The two free ends 291, 292 of the follower spring occupy seats in grooves 293, 294 of the lever 261 and constantly urge the lever upward. As these points of contact are further from the axis of the lever pin 260 than is the contact of loop 285 with the guard, the spring and the sleeve 286 are eccentrically displaced against the neck 288 of the lever pin as shown in Fig. 41. This eccentric displacement of the sleeve 286 yieldingly retains the pin 260 in place due to the shoulder 295 of the pin. The impulse of the follower spring against the lever 261 is transmitted through cam slots 283 to the trunnions 282 of the rocker and is effective in elevating the follower. The tension of the follower spring is sufficient, when the follower is elevated as in Fig. 33, to overcome the tension of the spring 242 acting on the bolt stop 236 and on the latch 252, so that the latch is withdrawn from the clip and the bolt stop is forced into its bolt holding position.

To assemble, with the guard removed from the receiver, the lever 261 is rotated about a half turn clockwise from Fig. 33 position. The unstressed follower spring and the sleeve are put in place with the loop 285 in the pocket 290 of the guard. The lever pin 260 is then assembled. Next, the follower 249 and the rocker 277 are assembled and the lever is rotated to its operative position to put the follower spring under its working tension. The rocker pin 278 is then assembled to secure the rocker to the guard.

Both the lever 261 and the rocker 277 are articulated to the follower 249 by the spherical heads 271 and 276, occupying bearing sockets in the follower. These sockets 272 and 275 are slotted out on their lower sides in order to allow the follower to rock to each side from a midway position shown in Fig. 44. The rocker head 276 is formed with a cam element or comb 296, Figs. 33 and 44, which does not influence the follower until the parts are elevated to a position adjacent the top of the magazine as shown in Fig. 33. The comb 296 then enters a V-shaped groove or cam element 297 of the follower and yieldingly wedges the follower to the upright or neutral position of Fig. 44, whereby the follower is made ready for charging the magazine with the clip of cartridges.

In charging, the lowermost cartridge of the clip first strikes the top 298 of the follower and depresses said follower. After a slight depression of the follower, the comb 296 is disengaged from its V-shaped groove 297, and the follower is free to rock to either side of its neutral position as shown in Figs. 72 and 73. The clip may have its lowermost cartridge C' in its left side, in which case the follower will be swung to the right as in Fig. 72. The top 298 of the follower thus supports the bottom cartridge C² of the right row, and the shoulder 299 of the follower supports the lowermost cartridge C' of the left row, thus both rows of the cartridge stack will be elevated in proper relation without one row wedging the other in the clip. If the clip happens to be filled with the lowermost cartridge C' on the right side, as in Fig. 73, the follower will be swung from the neutral position to the left side. The arrangement is such that both rows will be correctly supported, no matter which side of the clip carries the lowermost cartridge.

The clip ejector or kicker 263 is mounted in the guard with its rear end 300 under the guard ledges 301, 302, Figs. 33 and 34. The lower end 303 of the kicker engages behind shoulder 304 in the guard to prevent forward movement of the kicker. The tail 305 of the hook 116, Fig. 33, imposes initial tension on the flexible end 306 of the kicker when the magazine is empty. This tension retains the kicker end 303 behind the shoulder 304 of the guard.

The insertion of a filled clip into the magazine depresses the follower 249 from the position shown in Fig. 33. The surface 307 of the lever 261 shortly comes in contact with the end 308 of the kicker, to start the compression of the latter. Fig. 4 shows the filled clip inserted into the magazine to its feeding position where it is secured by the latch, see Fig. 36. The end 308 of the kicker is still engaged under the surface 307 of the lever. As the cartridges are fed out of the clip however, the lever 261 moves up into the clip away from contact with the kicker. The kicker thus rises until its side portions 264 are in contact with the clip, Fig. 68. The clip will now be ejected by the kicker when it is released by the latch as in Fig. 37. It is evident that the compressing of the kicker by its end 308 engaging under the lever surface 307 will be easier and through a greater distance than if the flanges 264 of the kicker were directly engaged by the clip during insertion. This eases the manual operation of charging the clip into the magazine.

The rifle may be carried with the barrel chamber 148 empty, but with a full clip of ten cartridges in the magazine. This is due to the extra depth of the magazine well, which permits the full clip to be manually depressed below its feeding position to allow the bolt to close over the top cartridge without feeding it into the chamber, see Fig. 3. By this arrangement the soldier may immediately recharge the magazine even after a period of long sustained firing when the barrel may be too hot for the storage of a cartridge in the chamber.

*Firing mechanism*

The hammer 127 pivoted in the guard on hammer pin 126 is urged forward by a bifurcated arched spring 310, Figs. 3, 4, and 29. The hammer pin mounted in guard extensions 108, 109 is retained from endwise movement by the enclosing side walls 114, 115 of the receiver, Fig. 13. The front ends 311 of the hammer spring 310 bear against a pair of necked studs 312 located one on each side of the hammer.

The trigger 313 carries staked thereto, the trigger pin 314, Fig. 29. The bearing ends of the trigger pin have bearing in the seats 315, 316 of the guard. These seats are opened out forwardly (Figs. 11 and 76) to allow the trigger pin to be moved laterally into its seats 315, 316. The trigger lobe 318 is then swung downward to engage behind surface 319 of the guard, to retain the trigger pin in its seats (Fig. 3). The rear end of the hammer spring 310 is seated in a notch 321 of the trigger with short prongs 322, 323 straddling the trigger to hold the spring end against lateral movement on the trigger, Figs. 3, 29 and 77. The rear end of the hammer spring acts as a trigger spring to urge the bottom of the trigger forward. When the hammer is back, as in Figs. 4 and 77, the spring 310 bears on the trigger at a distance above a line drawn from the center of the hammer stud 312 to the center of the trigger pin 314. When the hammer is forward, as in Fig. 3, the spring bears on the trigger at a lesser distance above a line drawn from the center of the hammer stud to the center of the trigger pin. This changing distance produces a trigger spring resistance which diminishes as the trigger is pulled, thus aiding a quick trigger release free from drag or "creep." The trigger has a stop lug 324, which, when the trigger is pulled, enters a notch 325 of the safety 326. The safety is in the form of a cylinder journaled in the guard and has an integral outside handle 327 for turning it to "open" and "safe" positions. Fig. 11 shows, in full lines, the safety handle in the "open" position and, in dotted lines, the "safe" position. When the handle 327 is swung to its dotted position, Fig. 11, the safety notch 325 is revolved out of register with the stop lug 324 of the trigger, thus blocking the latter from being pulled. When the safety is moved to its "safe" position its handle projects into the trigger guard in such a manner as to interfere with the placing of the soldier's finger on the trigger, thus calling attention to the "safe" position of the safety, see Fig. 11.

The safety 326 is mounted in the guard and its finger piece 327 (Fig. 28) limits its depth of engagement in the guard. The two stop lugs 336, 337 which abut a rib of the guard serve to limit its rotation. The safety is provided with a notch seat 338, Figs. 3 and 4, terminated by a shoulder 339, Fig. 28. The rear end 340 of the hook spring 134, engaging in the seat 338 of the safety, is interposed between the shoulder 339 and the side 119 of the guard, to hold the safety in position in the guard. The rear end 340 of the hook spring is provided with a notch 341 to clear the trigger stop surface 324 when the trigger is pulled.

The seat 338 of the safety is above a line drawn from the safety axis to the seat 130 of the hook 116 when the safety is in its "open" position so the hook spring is exerted to hold the safety in the "open" position. When the safety is in its "safe" position the seat 338 of the safety is below a line drawn from the safety axis to the seat 130 of the hook so the hook spring is exerted to hold the safety in its "safe" position. The rear side of the safety cylinder 326, by blocking the trigger lobe 318 holds the trigger in operative position in the guard (Fig. 77).

A forward arm 328 of the trigger extends under a lobe 329 of the hammer when the trigger is in its "pulled" position and the hammer is forward, Fig. 3. This interference prevents the trigger from assuming a "cocked" position to disengage lug 324 from the safety notch 325. Thus the safety may not be turned to its "safe" position for blocking the trigger movement except when the hammer is already cocked.

When the bolt is forward and the hammer is in its cocked position, the hammer notch 330 will be engaged under the sear 335 of the trigger. Pulling the trigger will release this engagement and permit the hammer, driven by the hammer spring, to fly forward to strike the rear end 225 of the firing pin, Fig. 3. As the bolt opens with rapidity it will cock the hammer before the finger tension on the lower end 330 of the trigger is released. In cocking automatically, therefore, the cam face 332 of the hammer forces back the secondary sear 333 of the trigger against the finger tension. The continuation of the finger tension on the lower end of the trigger however, moves the secondary sear 333 forward until it intercepts the path of the hammer secondary notch 334, Fig. 4. As the bolt goes forward the hammer rises until the hammer secondary notch 334 engages with the trigger secondary sear 333. This prevents "doubling" or the automatic firing of the rifle. Upon the trigger being released by the finger, the combined effect of the hammer spring 310 and the inclination of the secondary sear 333 of the trigger acts to move the top of the trigger back to its "cocked" position as the hammer rises urged by the hammer spring 310. The sear 335 of the trigger now engages the hammer notch 330 and holds the hammer in its cocked position.

ALTERNATE BOLT MECHANISM

In Figs. 80 to 90 inclusive, I have shown an alternative form of bolt mechanism which may be used for the breech closure in place of that heretofore described. In this alternate form the bolt carrier is designed to perform both the functions of a carrier and that of the cover of my first described bolt mechanism. Consequently, there are fewer parts in this second form—it will be lighter in weight and its cost of manufacture will be less than that of the first form.

The bolt 400 carries the same sort of locking lugs 140, 141 and radial arm 149 and will have the same action for opening and closing the breech as that previously described. The extractor, spring and plunger are also the same excepting that the tail of the plunger 401 has been extended and flattened to give it a limited spring action. This tail 401 projects through a bolt hole 402 in position to intercept an inward flange 403 of the carrier 404 when the carrier is in its forward position on the bolt. In this position notch 405 in the carrier flange 403 (Figs. 81 and 83) is occupied by the tail 401 of the plunger. The bolt shoulder 406, coacting with the shoulder 407 of the carrier, limits the endwise rear movement of the carrier on the bolt. The carrier partly surrounds the bolt and serves as a cover therefor. This carrier-cover member 404 carries two pairs of prongs 408, 409, 410, and 411, Figs. 83, 87, 88 and 90, which embrace the bolt and secure it to the carrier. When the bolt and attached carrier are removed from the receiver the carrier may be detached from the bolt by moving the bolt back to its limit in the carrier and then rotating the bolt beyond its unlocked position, Fig. 87. The tail 401 of the plunger, acting against the side of the notch 405 of the carrier, will yieldingly resist this rotation, to prevent accidental detachment. The bolt may now be further rotated and swung downward clear of the carrier around the right hand prongs 409, 411, as a pivot, the slots 412 and 413 being formed in the surface of the bolt to provide clearances for the carrier prongs 408 and 409.

The firing pin 414 has an upright lug 415 whose upper end reciprocates in a slot 416 of the carrier to prevent rotation of the firing pin with respect to the carrier. The lug 415 has a helix 417. When the bolt is in its locked position, the firing pin point 418 may protrude through the bolt face 419. In that position the firing pin lug 415 with respect to the rear end 420 of the bolt is shown by Fig. 85. As the bolt is unlocked its helical cam 421, coacting with the helix 417 of the firing pin, retracts the firing pin so that the lug 415 rides on the surface 422 of the bolt, Fig. 86. The firing pin has a lug 423, which lies ahead of shoulder 424 of a recess in the bolt, to retain the firing pin in the bolt. When the bolt is detached from the carrier the firing pin may be rotated to free the engagement of the firing pin lug 423 from the bolt shoulder 424 to permit the withdrawal of the firing pin.

The carrier 404 partakes only of sliding movement while the bolt has both a rotation in the carrier and a sliding movement relative thereto. The carrier is formed with the rib 425 on its right side near the rear end, which reciprocates in receiver groove 155a. At the left side of the carrier is the rib 426 which reciprocates in the left receiver groove 155. The receiver grooves are shown in Fig. 55. The rear end of the carrier serves to close the space between the rear end of the bolt and the end 223 of the opening of the receiver, Figs. 3, 10, and 11.

The ejector 427 is mounted in a lengthwise drilled hole 436 of the bolt as shown in Fig. 89. It is assembled through the front end of the bolt, after the ejector spring 428 and the plunger 429 are inserted. In assembled position a truncated cone head 430 of the plunger 429 engages above an inclined shoulder 431 at the tail of the ejector and displaces the rear end of the ejector downward so that a hook 432 thereof will catch against a "squared up" shoulder 433 of a radially drilled hole 434 in the bolt, Fig. 81. When the front end 435 of the ejector is forced rearwardly by a cartridge head, the rear end of the plunger 429 abuts the bottom 437 of the hole 436 and limits the inward movement of the ejector. In disassembly, a pointed tool is pressed through hole 434 against the bottom rear end of the ejector and forces the hook 432 above the "squared up" shoulder 433, whereby the ejector will drop out forwardly from the hole 436 in the bolt.

I claim:

1. In a rifle having a magazine chamber adapted to receive a clip of cartridges, a follower movable up and down in said magazine, a pair of supporting levers for said follower, one of said levers being spring actuated for elevating said follower, a clip ejector comprising a leaf spring mounted at the bottom of said chamber in position to be compressed by engagement of its outer end with an intermediate portion of said actuating lever when the follower is depressed by the charging of a clip into the magazine.

2. In a rifle having a magazine chamber adapted to receive a stack of cartridges in double row staggered relation, a follower movable up and down in said chamber and being formed as a single member with its upper surface shaped to provide alternatively a right hand and a left hand stepped support for the bottom of said stack, a pair of supporting levers for said follower, articulating means between the ends of said levers and said follower to permit transverse rocking of said follower from right to left hand positions as determined by the bottom of said stack, and follower positioning means operative when said follower is adjacent the top of said chamber to position said follower midway between its right and left hand rocked positions.

3. In a rifle having a magazine chamber adapted to receive a stack of cartridges in double row staggered relation, a follower movable up and down in said chamber and having a surface shaped to provide alternatively a right hand and a left hand stepped support for the bottom of said stack, a pair of supporting levers for said follower, ball and socket joints between the ends of said levers and said follower to permit transverse rocking of said follower from right to left hand positions as determined by the bottom of said stack, and means to position said follower midway between its right and left hand rocked positions when said follower is adjacent the top of said chamber, said positioning means comprising coacting cam elements, one on said follower and one on a supporting lever.

4. In a rifle having a magazine chamber adapted to receive a clip of cartridges, a follower movable up and down in said magazine, lifting mechanism for said follower comprising a lever and a spring, means for ejecting a clip from said magazine comprising a spring so positioned and arranged as to be compressed by said follower lever during a considerable part of the downward movement of said follower lever consequent upon the charging of a new clip into the magazine.

JOHN D. PEDERSEN.

CERTIFICATE OF CORRECTION.

Patent No. 2,330,737. September 28, 1943.

JOHN D. PEDERSEN.

It is hereby certified that error appears in the printed specification of the above numbered patent requiring correction as follows: Page 2, second column, line 45, for "retracted" read --forward--; page 5, second column, line 17, for "tenion 11" read --tenon 100--; and that the said Letters Patent should be read with this correction therein that the same may conform to the record of the case in the Patent Office.

Signed and sealed this 23rd day of November, A. D. 1943.

(Seal)

Henry Van Arsdale,
Acting Commissioner of Patents.